United States Patent
Kubota et al.

(10) Patent No.: US 11,311,864 B2
(45) Date of Patent: Apr. 26, 2022

(54) CARBON CATALYST, BATTERY ELECTRODE AND BATTERY

(71) Applicant: NISSHINBO HOLDINGS INC., Tokyo (JP)

(72) Inventors: Yuji Kubota, Chiba (JP); Takeaki Kishimoto, Funabashi (JP); Kumi Narizuka, Koga (JP); Tetsutaro Sato, Kisarazu (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 206 days.

(21) Appl. No.: 16/629,544

(22) PCT Filed: Jul. 3, 2018

(86) PCT No.: PCT/JP2018/025248
§ 371 (c)(1),
(2) Date: Jan. 8, 2020

(87) PCT Pub. No.: WO2019/013050
PCT Pub. Date: Jan. 17, 2019

(65) Prior Publication Data
US 2020/0171470 A1 Jun. 4, 2020

(30) Foreign Application Priority Data
Jul. 13, 2017 (JP) ............................. JP2017-137456

(51) Int. Cl.
*B01J 27/24* (2006.01)
*B01J 35/10* (2006.01)
(Continued)

(52) U.S. Cl.
CPC .......... *B01J 27/24* (2013.01); *B01J 35/1023* (2013.01); *H01M 4/90* (2013.01); *H01M 12/06* (2013.01);
(Continued)

(58) Field of Classification Search
CPC ........ B01J 27/24; B01J 35/1023; B01J 21/18; B01J 35/0033; H01M 4/90; H01M 12/06;
(Continued)

(56) References Cited

U.S. PATENT DOCUMENTS

2004/0067847 A1* 4/2004 Kato ..................... H01M 4/926
502/325
2013/0168321 A1* 7/2013 Cannon ................ B01J 20/3248
210/684

(Continued)

FOREIGN PATENT DOCUMENTS

EP 2 298 443 A1 3/2011
JP 2007-207662 A 8/2007
(Continued)

OTHER PUBLICATIONS

Translation of Written Opinion for PCT/JP2018/025248. (Year: 2018).*
(Continued)

*Primary Examiner* — Patricia L. Hailey
(74) *Attorney, Agent, or Firm* — Oliff PLC

(57) ABSTRACT

A carbon catalyst has: a carbon structure that exhibits a nitrogen desorption temperature range from 800° C.-1,000° C. of $0.75 \times 10^{-5}$ mol/g or more or a nitrogen desorption amount in the range from 600° C. to 1,000° C. of $1.20 \times 10^{-5}$ mol/g or more in a temperature programmed desorption method including measuring nitrogen desorption amount temperature range from 600° C.-1,000° C.; a carbon structure exhibits a zeta potential isoelectric point of pH 9.2 or more; or a carbon structure exhibits a ratio of an intensity of a first nitrogen peak within a range of a binding energy of 398.0±1.0 eV, to an intensity of a second nitrogen peak having a peak top within a range of a binding energy of 400.5±1.0 eV, of 0.620 or more, the first and second nitrogen peaks obtained by separating a peak derived from a 1s
(Continued)

orbital of a nitrogen atom in a photoelectron spectrum obtained by X-ray photoelectron spectroscopy.

15 Claims, 6 Drawing Sheets

(51) Int. Cl.
*H01M 4/90* (2006.01)
*H01M 12/06* (2006.01)
*H01M 4/88* (2006.01)
*H01M 8/18* (2006.01)
*H01M 12/08* (2006.01)

(52) U.S. Cl.
CPC ............ *H01M 4/8828* (2013.01); *H01M 8/18* (2013.01); *H01M 12/08* (2013.01)

(58) Field of Classification Search
CPC ...... H01M 4/8828; H01M 8/18; H01M 12/08; C01P 2006/90; C01P 2002/85; C01P 2002/74; C01P 2002/86
USPC ............... 502/182, 185; 423/445 R; 429/523
See application file for complete search history.

(56) References Cited

U.S. PATENT DOCUMENTS

| | | | |
|---|---|---|---|
| 2014/0011672 A1* | 1/2014 | Kishimoto | H01M 4/9083 502/182 |
| 2014/0353144 A1 | 12/2014 | Nakanishi et al. | |
| 2016/0028135 A1* | 1/2016 | Iida | H01M 4/96 429/405 |
| 2017/0194653 A1 | 7/2017 | Imashiro et al. | |

FOREIGN PATENT DOCUMENTS

| | | |
|---|---|---|
| JP | 2013-530039 A | 7/2013 |
| JP | 2013-154258 A | 8/2013 |
| WO | 2011/157800 A1 | 12/2011 |
| WO | 2013/089026 A1 | 6/2013 |
| WO | 2016/088716 A1 | 6/2016 |

OTHER PUBLICATIONS

Mar. 5, 2021 Extended Search Report issued in European Patent Application No. 18832863.7.
Wang et al., "Liquid phase aerobic oxidation of benzyl alcohol over Pd and Rh catalysts on N-doped mesoporous carbon: Effect of the surface acido-basicity," Catalysis Communications, 2012, vol. 25, pp. 96-101.
Oh et al., "Modification of poyol process for synthesis of highly platinum loaded platinum-carbon catalysts for fuel cells," Journal of Power Sources, 2008. vol. 183, pp. 600-603.
Sep. 18, 2018 International Search Report issued in International Patent Application No. PCT/JP2018/025248.

* cited by examiner

FIG.3

| | CATALYTIC ACTIVITY | | DURABILITY | TPD NITROGEN DESORPTION AMOUNT (mol/g) | | ZETA POTENTIAL ISOELECTRIC POINT pH | N/C RATIO (%) | XPS | | BET SPECIFIC SURFACE AREA (m²/g) | PEAK IN VICINITY OF 150 ppm OF 13C SOLID STATE NMR |
| --- | --- | --- | --- | --- | --- | --- | --- | --- | --- | --- | --- |
| | E$_{O2}$ (V vs. RHE) | i$_{0.7}$ (mA/cm²) | POTENTIAL DECREASE AMOUNT (mV) | 600°C ~1000°C | 800°C ~1000°C | | | FIRST/SECOND NITROGEN INTENSITY RATIO | FIRST NITROGEN/C$_{1s}$ INTENSITY RATIO | | |
| EXAMPLE 1 | 0.825 | -1.74 | 61 | 55.50E-05 | 2.72E-05 | 9.5 | 3.5 | 1.346 | 0.036 | 1549 | PRESENT |
| EXAMPLE 2 | 0.835 | -1.79 | 43 | 49.60E-05 | 34.60E-05 | 12.0 | 10.3 | 0.966 | 0.109 | 1540 | PRESENT |
| EXAMPLE 3 | 0.840 | -2.06 | 57 | 49.60E-05 | 34.60E-05 | 11.6 | 8.4 | 0.948 | 0.061 | 1538 | PRESENT |
| EXAMPLE 4 | 0.825 | -1.53 | 75 | 16.50E-05 | 14.70E-05 | 11.5 | 8.0 | 0.877 | 0.083 | 1532 | PRESENT |
| EXAMPLE 5 | 0.838 | -1.95 | 77 | 3.50E-05 | 2.50E-05 | 11.2 | 7.1 | 0.893 | 0.078 | 1355 | PRESENT |
| EXAMPLE 6 | 0.835 | -1.75 | 36 | 49.70E-05 | 34.70E-05 | 12.0 | 10.3 | 0.966 | 0.110 | 1530 | PRESENT |
| EXAMPLE 7 | 0.834 | -1.75 | 39 | 49.60E-05 | 34.60E-05 | 12.0 | 10.2 | 0.966 | 0.109 | 1535 | PRESENT |
| EXAMPLE 8 | 0.833 | -1.74 | 50 | 55.10E-05 | 2.72E-05 | 10.0 | 4.1 | 1.346 | 0.036 | 1540 | PRESENT |
| EXAMPLE 9 | 0.828 | -1.65 | 66 | 54.10E-05 | 2.71E-05 | 9.5 | 3.5 | 1.345 | 0.034 | 1545 | PRESENT |
| EXAMPLE 10 | 0.830 | -1.70 | 67 | 51.50E-05 | 2.80E-05 | 9.5 | 3.5 | 1.298 | 0.026 | 1560 | PRESENT |
| EXAMPLE 11 | 0.826 | -1.65 | 68 | 52.00E-05 | 2.82E-05 | 9.5 | 3.5 | 1.246 | 0.036 | 1530 | PRESENT |
| EXAMPLE 12 | 0.827 | -1.63 | 68 | 53.30E-05 | 2.72E-05 | 9.5 | 3.5 | 1.333 | 0.036 | 1532 | PRESENT |
| EXAMPLE 13 | 0.830 | -1.69 | 67 | 51.20E-05 | 2.70E-05 | 9.5 | 3.5 | 1.300 | 0.040 | 1535 | PRESENT |
| EXAMPLE 14 | 0.826 | -1.67 | 67 | 51.60E-05 | 2.71E-05 | 9.5 | 3.5 | 1.345 | 0.036 | 1525 | PRESENT |
| COMPARATIVE EXAMPLE 1 | 0.827 | -1.71 | 117 | 0.89E-05 | 0.15E-05 | 9.0 | 1.9 | 0.558 | 0.012 | 1371 | ABSENT |
| COMPARATIVE EXAMPLE 2 | 0.831 | -1.70 | 121 | 1.10E-05 | 0.74E-05 | 9.1 | 1.9 | 0.530 | 0.013 | 1232 | ABSENT |
| COMPARATIVE EXAMPLE 3 | 0.834 | -1.86 | 121 | 0.21E-05 | 0.20E-05 | 8.5 | 2.0 | 0.610 | 0.015 | 1505 | ABSENT |
| COMPARATIVE EXAMPLE 4 | 0.828 | -1.72 | 127 | 0.88E-05 | 0.15E-05 | 9.0 | 1.9 | 0.555 | 0.010 | 1352 | ABSENT |
| COMPARATIVE EXAMPLE 5 | 0.829 | -1.70 | 127 | 0.88E-05 | 0.15E-05 | 9.0 | 1.9 | 0.558 | 0.012 | 1220 | ABSENT |
| COMPARATIVE EXAMPLE 6 | 0.827 | -1.51 | 121 | 0.20E-05 | 0.20E-05 | 9.0 | 2.0 | 0.601 | 0.015 | 1378 | ABSENT |

FIG.4

| AIR CELL | POSITIVE ELECTRODE | NEGATIVE ELECTRODE | MAXIMUM OUTPUT DENSITY [mW/cm²] |
|---|---|---|---|
| ZINC AIR CELL | CARBON CATALYST | ZINC | 119 |
| | CARBON BLACK | | 79 |
| MAGNESIUM AIR CELL | CARBON CATALYST | MAGNESIUM | 104 |
| | CARBON BLACK | | 65 |

FIG.5

| AIR CELL | POSITIVE ELECTRODE | NEGATIVE ELECTRODE | MAXIMUM OUTPUT DENSITY [%] |
|---|---|---|---|
| ZINC AIR CELL | CARBON CATALYST | ZINC | 91 |
| | CARBON BLACK | | 34 |
| MAGNESIUM AIR CELL | CARBON CATALYST | MAGNESIUM | 89 |
| | CARBON BLACK | | 37 |

CARBON CATALYST, BATTERY ELECTRODE AND BATTERY

TECHNICAL FIELD

The present invention relates to a carbon catalyst, a battery electrode, and a battery.

BACKGROUND ART

Currently, as a catalyst for an electrode of a fuel cell, a platinum catalyst is used. However, there are many problems to be solved. For example, the reserves of platinum are limited. In a polymer electrolyte fuel cell (PEFC), the use of platinum increases cost. Therefore, an alternative technology that does not use platinum has been developed.

Specifically, for example, in Patent Literature 1, there is described an electrode catalyst for a fuel cell, which is formed of a carbonized material obtained by carbonizing an ion exchange resin containing a transition metal, and in which many carbon particles each having a shell-like structure with an average particle diameter of from 10 nm to 20 nm assemble in a non-aggregated state.

CITATION LIST

Patent Literature

[PTL 1] JP 2007-207662 A

SUMMARY OF INVENTION

Technical Problem

However, it has hitherto been difficult to obtain a carbon catalyst having excellent durability.

The present invention has been made in view of the above-mentioned problem, and one of the objects of the present invention is to provide a carbon catalyst, a battery electrode, and a battery, each having excellent durability.

Solution to Problem

In order to solve the above-mentioned problem, in one aspect, a carbon catalyst according to one embodiment of the present invention includes a carbon structure that exhibits a nitrogen desorption amount in the temperature range from 800° C. to 1,000° C. of $0.75 \times 10^{-5}$ mol/g or more in a temperature programmed desorption method including measuring a nitrogen desorption amount in the temperature range from 600° C. to 1,000° C. According to the one embodiment of the present invention, a carbon catalyst having excellent durability is provided.

In order to solve the above-mentioned problem, in another aspect, the carbon catalyst according to the one embodiment of the present invention includes a carbon structure that exhibits a nitrogen desorption amount in the temperature range from 600° C. to 1,000° C. of $1.20 \times 10^{-5}$ mol/g or more in a temperature programmed desorption method including measuring a nitrogen desorption amount in the temperature range from 600° C. to 1,000° C. According to the one embodiment of the present invention, a carbon catalyst having excellent durability is provided.

In order to solve the above-mentioned problem, instill another aspect, the carbon catalyst according to the one embodiment of the present invention includes a carbon structure that exhibits a zeta potential isoelectric point of pH 9.2 or more. According to the one embodiment of the present invention, a carbon catalyst having excellent durability is provided.

In order to solve the above-mentioned problem, in still another aspect, the carbon catalyst according to the one embodiment of the present invention includes a carbon structure that exhibits a ratio of an intensity of a first nitrogen peak that has a peak top within a range of a binding energy of $398.0 \pm 1.0$ eV to an intensity of a second nitrogen peak that has a peak top within a range of a binding energy of $400.5 \pm 1.0$ eV of 0.620 or more, the first nitrogen peak and the second nitrogen peak being obtained by separating a peak derived from a is orbital of a nitrogen atom in a photoelectron spectrum obtained by X-ray photoelectron spectroscopy. According to the one embodiment of the present invention, a carbon catalyst having excellent durability is provided.

In addition, the carbon catalyst may include the carbon structure that exhibits a ratio of an intensity of a first nitrogen peak that has a peak top within a range of a binding energy of $398.0 \pm 1.0$ eV to an intensity of a peak derived from a is orbital of a carbon atom of 0.017 or more, the first nitrogen peak being obtained by separating a peak derived from a is orbital of a nitrogen atom in a photoelectron spectrum obtained by X-ray photoelectron spectroscopy.

In addition, the carbon catalyst may include the carbon structure that exhibits a ratio of a nitrogen atom concentration to a carbon atom concentration of 1.5% or more, the nitrogen atom concentration and the carbon atom concentration being measured by X-ray photoelectron spectroscopy. In addition, the carbon catalyst may include the carbon structure in which a peak is observed in a vicinity of a chemical shift of 150 ppm in a spectrum obtained by $^{13}$C solid state nuclear magnetic resonance measurement.

In addition, the carbon catalyst may include a metal. In addition, the carbon catalyst may include a specific surface area of 800 m$^2$/g or more measured by a BET method. In addition, the carbon catalyst may include the carbon structure that has a nitrogen atom content of 1.5 wt % or more measured by elemental analysis based on a combustion method.

In order to solve the above-mentioned problem, a battery electrode according to one embodiment of the present invention includes any one of the above-mentioned carbon catalysts. According to the one embodiment of the present invention, a battery electrode including a carbon catalyst having excellent durability is provided.

In order to solve the above-mentioned problem, a battery according to one embodiment of the present invention includes the above-mentioned battery electrode. According to the one embodiment of the present invention, a battery including a carbon catalyst having excellent durability is provided.

Advantageous Effects of Invention

According to the present invention, a carbon catalyst, a battery electrode, and a battery, each having excellent durability are provided.

BRIEF DESCRIPTION OF DRAWINGS

FIG. 3 is an explanatory diagram for showing results obtained by evaluating carbon catalysts of Examples according to one embodiment of the present invention.

FIG. 4 is an explanatory diagram for showing results obtained by evaluating a maximum output density of an air cell of an Example according to one embodiment of the present invention.

FIG. 5 is an explanatory diagram for showing results obtained by evaluating an output maintenance ratio of the air cell of an Example according to the one embodiment of the present invention.

DESCRIPTION OF EMBODIMENTS

Figure 1:
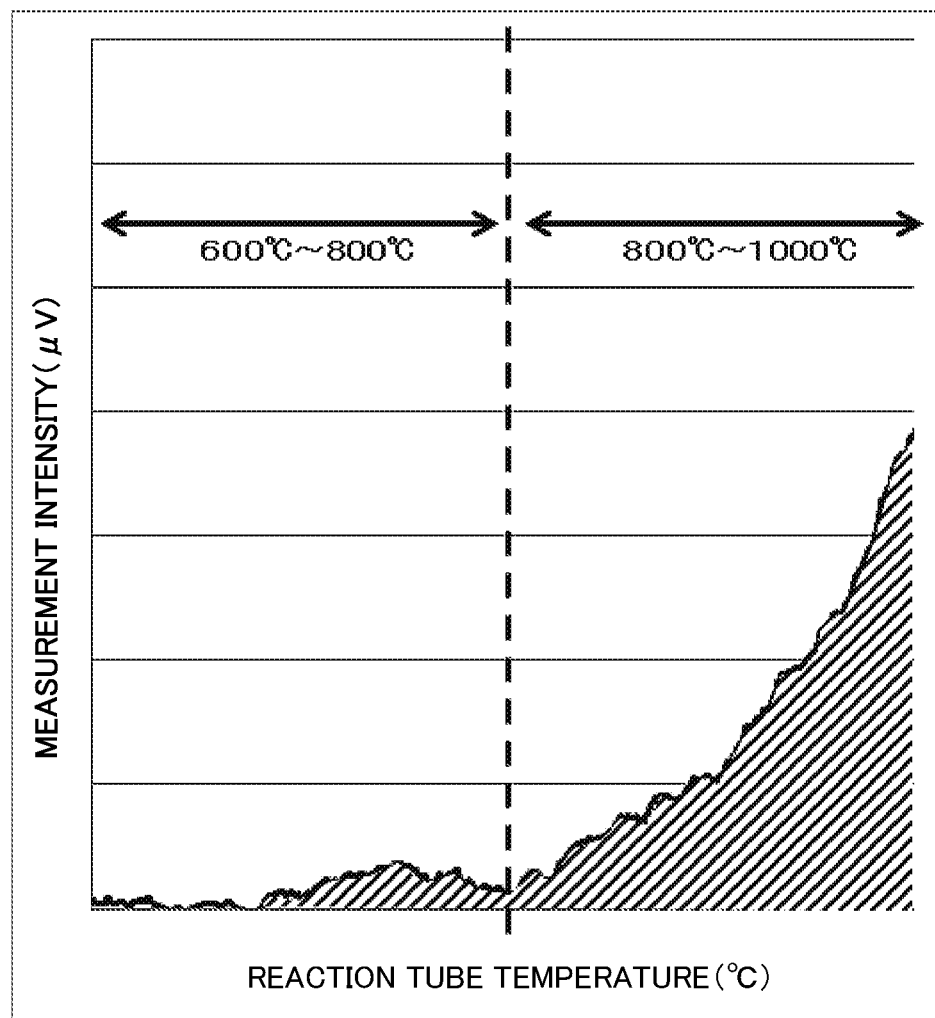
FIG. 1 is an explanatory diagram for showing results obtained by measuring nitrogen (mass number: 14) of a carbon catalyst of Example 4 according to one embodiment of the present invention by a temperature programmed desorption method.

Now, a carbon catalyst according to one embodiment of the present invention (hereinafter referred to as "catalyst of the present invention"), a battery electrode according to one embodiment of the present invention (hereinafter referred to as "electrode of the present invention"), and a battery according to one embodiment of the present invention (hereinafter referred to as "battery of the present invention") will be described. The present invention is not limited to examples described in this embodiment.

The inventors of the present invention have undertaken extensive investigations into technical means for obtaining a carbon catalyst having excellent durability, and as a result, have uniquely found that a carbon catalyst, which has a carbon structure containing a large amount of a particular nitrogen-containing group that causes desorption of nitrogen at a relatively high temperature (that is, 600° C. or more, in particular 800° C. or more) in a temperature programmed desorption method, has excellent durability, to thereby complete the present invention.

In one aspect, the catalyst according to the one embodiment of the present invention has a carbon structure that exhibits a nitrogen ($N_2$) desorption amount in the temperature range from 800° C. to 1,000° C. of $0.75 \times 10^{-5}$ mol/g or more in a temperature programmed desorption method (hereinafter referred to as "TPD") including measuring a nitrogen desorption amount in the temperature range from 600° C. to 1,000° C.

In this case, the carbon structure of the catalyst of the present invention exhibits a $N_2$ desorption amount in the temperature range from 800° C. to 1,000° C. in the TPD of preferably $1.00 \times 10^{-5}$ mol/g or more, more preferably $1.50 \times 10^{-5}$ mol/g or more, still more preferably $2.00 \times 10^{-5}$ mol/g or more, and particularly preferably $2.30 \times 10^{-5}$ mol/g or more.

The catalyst of the present invention has the carbon structure that exhibits a value for the $N_2$ desorption amount in the temperature range from 800° C. to 1,000° C. in the TPD equal to or more than the above-mentioned particular threshold value, and hence has excellent durability. While there is no particular limitation on an upper limit value of the above-mentioned $N_2$ desorption amount in the temperature range from 800° C. to 1,000° C. of the catalyst of the present invention, the $N_2$ desorption amount may be $45.00 \times 10^{-5}$ mol/g or less.

In another aspect, the catalyst according to the one embodiment of the present invention has a carbon structure that exhibits a $N_2$ desorption amount in the temperature range from 600° C. to 1,000° C. of $1.20 \times 10^{-5}$ mol/g or more in TPD including measuring a $N_2$ desorption amount in the temperature range from 600° C. to 1,000° C.

In this case, the carbon structure of the catalyst of the present invention exhibits a $N_2$ desorption amount in the temperature range from 600° C. to 1,000° C. in the TPD of preferably $1.50 \times 10^{-5}$ mol/g or more, more preferably $2.00 \times 10^{-5}$ mol/g or more, still more preferably $2.50 \times 10^{-5}$ mol/g or more, and particularly preferably $3.00 \times 10^{-5}$ mol/g or more.

The catalyst of the present invention has the carbon structure that exhibits a value for the $N_2$ desorption amount in the temperature range from 600° C. to 1,000° C. in the TPD equal to or more than the above-mentioned particular threshold value, and hence has excellent durability. While there is no particular limitation on an upper limit value of the $N_2$ desorption amount in the temperature range from 600° C. to 1,000° C. of the catalyst of the present invention, the $N_2$ desorption amount may be $65.00 \times 10^{-5}$ mol/g or less.

In addition, the catalyst of the present invention may have a carbon structure that exhibits, in the TPD, a $N_2$ desorption amount in the temperature range from 800° C. to 1,000° C. of $0.75 \times 10^{-5}$ mol/g or more and a $N_2$ desorption amount in the temperature range from 600° C. to 1,000° C. of $1.20 \times 10^{-5}$ mol/g or more. In this case, the carbon structure of the catalyst of the present invention may be specified by appropriately combining: one of the threshold values for the $N_2$ desorption amount in the temperature range from 800° C. to 1,000° C.; and one of the threshold values for the $N_2$ desorption amount in the temperature range from 600° C. to 1,000° C.

Specifically, for example, the carbon structure of the catalyst of the present invention exhibits, in the TPD, preferably a $N_2$ desorption amount in the temperature range from 800° C. to 1,000° C. of $1.00 \times 10^{-5}$ mol/g or more and a $N_2$ desorption amount in the temperature range from 600° C. to 1,000° C. of $1.50 \times 10^{-5}$ mol/g or more, more preferably a $N_2$ desorption amount in the temperature range from 800° C. to 1,000° C. of $1.50 \times 10^{-5}$ mol/g or more and a $N_2$ desorption amount in the temperature range from 600° C. to 1,000° C. of $2.00 \times 10^{-5}$ mol/g or more, still more preferably a $N_2$ desorption amount in the temperature range from 800° C. to 1,000° C. of $2.00 \times 10^{-5}$ mol/g or more and a $N_2$ desorption amount in the temperature range from 600° C. to 1,000° C. of $2.50 \times 10^{-5}$ mol/g or more, and particularly preferably a $N_2$ desorption amount in the temperature range from 800° C. to 1,000° C. of $2.30 \times 10^{-5}$ mol/g or more and a $N_2$ desorption amount in the temperature range from 600° C. to 1,000° C. of $3.00 \times 10^{-5}$ mol/g or more.

In the TPD, first, the carbon catalyst is heated to 600° C. in an atmosphere of inert gas (e.g., nitrogen or helium) to remove a functional group and an adsorption component that are desorbed at a relatively low temperature. After that, the carbon catalyst is further heated, and a $N_2$ desorption amount from the carbon catalyst is measured within the temperature range from 600° C. to 1,000° C.

The $N_2$ desorption amount within the relatively high particular temperature range in the TPD specified for the catalyst of the present invention specifies the quality and amount of a nitrogen-containing functional group contained in the carbon structure of the catalyst of the present invention, and thus specifies the structure of the catalyst of the present invention itself. Specifically, the catalyst of the present invention has a carbon structure containing a particular nitrogen-containing functional group that causes desorption of $N_2$ in the above-mentioned relatively large particular amount within the above-mentioned relatively high particular temperature range in the TPD.

In addition, the inventors of the present invention have undertaken extensive investigations into technical means for obtaining a carbon catalyst having excellent durability, and as a result, have uniquely found that a carbon catalyst, which has a carbon structure that exhibits a value for a zeta potential isoelectric point equal to or more than a particular threshold value, has excellent durability, to thereby complete the present invention.

Specifically, in still another aspect, the catalyst of the one embodiment of the present invention has a carbon structure that exhibits a zeta potential isoelectric point of pH 9.2 or more. In this case, the zeta potential isoelectric point exhibited by the carbon structure of the catalyst of the present invention is preferably pH 9.3 or more, more preferably pH 9.4 or more, and particularly preferably pH 9.5 or more.

The catalyst of the present invention has the carbon structure that exhibits a value for the zeta potential isoelectric point equal to or more than the above-mentioned relatively high particular threshold value, and hence has excellent durability. It is considered that the fact that the carbon structure of the catalyst of the present invention exhibits a relatively high zeta potential isoelectric point reflects, for example, that the carbon structure of the catalyst of the present invention contains a particularly large amount of a nitrogen-containing functional group having a positive charge. While there is no particular limitation on an upper limit value of the zeta potential isoelectric point of the catalyst of the present invention, the isoelectric point may be pH 13.0 or less.

In this case, it is considered that the fact that the catalyst of the present invention has the carbon structure that exhibits a zeta potential isoelectric point equal to or more than the above-mentioned relatively high particular threshold value contributes to improvement in durability through anion binding inhibition (sacrifice effect). Specifically, it is considered that poisoning of the carbon catalyst is caused by adsorption of an anion (e.g., sulfuric acid), which is a decomposition product of an ionomer, to an active point having a positive charge contained in the carbon structure (oxidation of the active point). However, the carbon structure of the catalyst of the present invention contains a large amount of a nitrogen-containing functional group having a positive charge similarly to the active point, and hence it is considered that the active point contained in the carbon structure is maintained by virtue of the sacrifice effect of adsorption of the anion to the nitrogen-containing functional group, with the result that the occurrence of the poisoning is suppressed.

In addition, the catalyst of the present invention may have a carbon structure that exhibits a $N_2$ desorption amount in the temperature range from 800° C. to 1,000° C. of $0.750 \times 10^{-5}$ mol/g or more in the TPD and a zeta potential isoelectric point of pH 9.2 or more. In this case, the carbon structure of the catalyst of the present invention may be specified by appropriately combining: one of the above-mentioned threshold values for the $N_2$ desorption amount in the temperature range from 800° C. to 1,000° C.; and one of the above-mentioned threshold values for the zeta potential isoelectric point.

Specifically, for example, the carbon structure of the catalyst of the present invention exhibits preferably a $N_2$ desorption amount in the temperature range from 800° C. to 1,000° C. of $1.00 \times 10^{-5}$ mol/g or more in the TPD and a zeta potential isoelectric point of pH 9.2 or more, more preferably a $N_2$ desorption amount in the temperature range from 800° C. to 1,000° C. of $1.50 \times 10^{-5}$ mol/g or more in the TPD and a zeta potential isoelectric point of pH 9.3 or more, still more preferably a $N_2$ desorption amount in the temperature range from 800° C. to 1,000° C. of $2.00 \times 10^{-5}$ mol/g or more in the TPD and a zeta potential isoelectric point of pH 9.4 or more, and particularly preferably a $N_2$ desorption amount in the temperature range from 800° C. to 1,000° C. of $2.30 \times 10^{-5}$ mol/g or more in the TPD and a zeta potential isoelectric point of pH 9.5 or more.

In addition, the catalyst of the present invention may have a carbon structure that exhibits a $N_2$ desorption amount in the temperature range from 600° C. to 1,000° C. of $1.20 \times 10^{-5}$ mol/g or more in the TPD and a zeta potential isoelectric point of pH 9.2 or more. In this case, the carbon structure of the catalyst of the present invention may be specified by appropriately combining: one of the above-mentioned threshold values for the $N_2$ desorption amount in the temperature range from 600° C. to 1,000° C.; and one of the above-mentioned threshold values for the zeta potential isoelectric point.

Specifically, for example, the carbon structure of the catalyst of the present invention exhibits preferably a $N_2$ desorption amount in the temperature range from 600° C. to 1,000° C. of $1.50 \times 10^{-5}$ mol/g or more in the TPD and a zeta potential isoelectric point of pH 9.2 or more, more preferably a $N_2$ desorption amount in the temperature range from 600° C. to 1,000° C. of $2.00 \times 10^{-5}$ mol/g or more in the TPD and a zeta potential isoelectric point of pH 9.3 or more, still more preferably a $N_2$ desorption amount in the temperature range from 600° C. to 1,000° C. of $2.50 \times 10^{-5}$ mol/g or more in the TPD and a zeta potential isoelectric point of pH 9.4 or more, and particularly preferably a $N_2$ desorption amount in the temperature range from 600° C. to 1,000° C. of $3.00 \times 10^{-5}$ mol/g or more in the TPD and a zeta potential isoelectric point of pH 9.5 or more.

In addition, the catalyst of the present invention may have a carbon structure that exhibits a $N_2$ desorption amount in the temperature range from 800° C. to 1,000° C. of $0.750 \times 10^{-5}$ mol/g or more, a $N_2$ desorption amount in the temperature range from 600° C. to 1,000° C. of $1.20 \times 10^{-5}$ mol/g or more in the TPD and a zeta potential isoelectric point of pH 9.2 or more. In this case, the carbon structure of the catalyst of the present invention may be specified by appropriately combining: one of the above-mentioned threshold values for the $N_2$ desorption amount in the temperature range from 800° C. to 1,000° C.; one of the above-mentioned threshold values for the $N_2$ desorption amount in the temperature range from 600° C. to 1,000° C.; and one of the above-mentioned threshold values for the zeta potential isoelectric point.

Specifically, for example, the carbon structure of the catalyst of the present invention exhibits preferably a $N_2$ desorption amount in the temperature range from 800° C. to 1,000° C. of $1.00 \times 10^{-5}$ mol/g or more, a $N_2$ desorption amount in the temperature range from 600° C. to 1,000° C. of $1.50 \times 10^{-5}$ mol/g or more in the TPD and a zeta potential isoelectric point of pH 9.2 or more, more preferably a $N_2$ desorption amount in the temperature range from 800° C. to 1,000° C. of $1.50 \times 10^{-5}$ mol/g or more, a $N_2$ desorption amount in the temperature range from 600° C. to 1,000° C. of $2.00 \times 10^{-5}$ mol/g or more in the temperature programmed desorption method, and a zeta potential isoelectric point of pH 9.3 or more, still more preferably a $N_2$ desorption amount in the temperature range from 800° C. to 1,000° C. of $2.00 \times 10^{-5}$ mol/g or more, a $N_2$ desorption amount in the temperature range from 600° C. to 1,000° C. of $2.50 \times 10^{-5}$ mol/g or more in the temperature programmed desorption method, and a zeta potential isoelectric point of pH 9.4 or more, and particularly preferably a $N_2$ desorption amount in the temperature range from 800° C. to 1,000° C. of $2.30 \times 10^{-5}$ mol/g or more, a $N_2$ desorption amount in the temperature range from 600° C. to 1,000° C. of $3.00 \times 10^{-5}$ mol/g or more in the TPD, and a zeta potential isoelectric point of pH 9.5 or more.

In addition, the inventors of the present invention have undertaken extensive investigations into technical means for obtaining a carbon catalyst having excellent durability, and as a result, have uniquely found that a carbon catalyst, which has a carbon structure that exhibits a value for an intensity ratio between two particular nitrogen peaks obtained by separating a peak derived from a 1s orbital of a nitrogen atom in a photoelectron spectrum obtained by X-ray photoelectron spectroscopy equal to or more than a particular threshold value, has excellent durability, to thereby complete the present invention.

Specifically, in still another aspect, the catalyst according to the one embodiment of the present invention has a carbon structure that exhibits a ratio of an intensity of a first nitrogen peak that has a peak top within a range of a binding energy of 398.0±1.0 eV to an intensity of a second nitrogen peak that has a peak top within a range of a binding energy of 400.5±1.0 eV (hereinafter referred to as "first/second nitrogen intensity ratio") of 0.620 or more, the first nitrogen peak and the second nitrogen peak being obtained by separating a peak derived from a 1s orbital of a nitrogen atom (hereinafter referred to as "$N_{1s}$ peak") in a photoelectron spectrum obtained by X-ray photoelectron spectroscopy (hereinafter referred to as "XPS").

In this case, the first/second nitrogen intensity ratio exhibited by the carbon structure of the catalyst of the present invention is preferably 0.700 or more, more preferably 0.750 or more, still more preferably 0.800 or more, and particularly preferably 0.850 or more.

The catalyst of the present invention has the carbon structure that exhibits a value for the first/second nitrogen intensity ratio obtained from a photoelectron spectrum obtained by the XPS equal to or more than the above-mentioned relatively high particular threshold value, and hence has excellent durability. The fact that the carbon structure of the catalyst of the present invention exhibits the relatively high first/second nitrogen intensity ratio reflects that the amount of a particular nitrogen-containing functional group exhibiting the above-mentioned first nitrogen peak contained in the carbon structure of the catalyst of the present invention is particularly large. Specifically, the catalyst of the present invention has the carbon structure containing a large amount of the particular nitrogen-containing functional group exhibiting the above-mentioned first nitrogen peak, and hence has excellent durability. While there is no particular limitation on an upper limit value of the above-mentioned first/second nitrogen intensity ratio of the catalyst of the present invention, the first/second nitrogen intensity ratio may be 1.600 or less.

In this case, it is considered that the fact that the catalyst of the present invention has the carbon structure that exhibits the relatively high first/second nitrogen intensity ratio contributes to improvement in durability through anion binding inhibition (sacrifice effect). Specifically, it is considered that poisoning of the carbon catalyst is caused by adsorption of an anion (e.g., sulfuric acid), which is a decomposition product of an ionomer, to an active point having a positive charge contained in the carbon structure (oxidation of the active point). However, the catalyst of the present invention has a carbon structure that exhibits a relatively high first/second nitrogen intensity ratio, that is, a carbon structure that contains a large amount of a particular nitrogen-containing functional group exhibiting a first nitrogen peak, and hence it is considered that the active point contained in the carbon structure is maintained by virtue of the sacrifice effect of adsorption of the anion to the particular nitrogen-containing functional group, with the result that the occurrence of the poisoning is suppressed. More specifically, it is considered that the nitrogen-containing functional group exhibiting a first nitrogen peak includes a nitrile group, and the nitrile group is oxidized to a carboxylic acid through an amide group, that is, oxidized in two stages. Therefore, it is considered that a particularly high sacrifice effect is exhibited.

The above-mentioned $N_{1s}$ peak is separated into the first nitrogen peak, the second nitrogen peak, and a third nitrogen peak by the above-mentioned peak separation. The third nitrogen peak is identified as a peak having a lowest intensity (intensity of a peak top) of the three peaks obtained by separating the $N_{1s}$ peak.

The catalyst of the present invention may have a carbon structure that exhibits a $N_2$ desorption amount in the temperature range from 800° C. to 1,000° C. of $0.750 \times 10^{-5}$ mol/g or more in the TPD and a first/second nitrogen intensity ratio of 0.620 or more obtained by the XPS. In this case, the carbon structure of the catalyst of the present invention may be specified by appropriately combining: one of the above-mentioned threshold values for the $N_2$ desorption amount in the temperature range from 800° C. to 1,000° C.; and one of the above-mentioned threshold values for the first/second nitrogen intensity ratio.

Specifically, for example, the carbon structure of the catalyst of the present invention exhibits preferably a $N_2$ desorption amount in the temperature range from 800° C. to 1,000° C. of $1.00 \times 10^{-5}$ mol/g or more in the TPD and a first/second nitrogen intensity ratio of 0.700 or more obtained by the XPS, more preferably a $N_2$ desorption amount in the temperature range from 800° C. to 1,000° C. of $1.50 \times 10^{-5}$ mol/g or more in the TPD and a first/second nitrogen intensity ratio of 0.750 or more obtained by the XPS, still more preferably a $N_2$ desorption amount in the temperature range from 800° C. to 1,000° C. of $2.00 \times 10^{-5}$ mol/g or more in the TPD and a first/second nitrogen intensity ratio of 0.800 or more obtained by the XPS, and particularly preferably a $N_2$ desorption amount in the temperature range from 800° C. to 1,000° C. of $2.30 \times 10^{-5}$ mol/g or more in the TPD and a first/second nitrogen intensity ratio of 0.850 or more obtained by the XPS.

In addition, the catalyst of the present invention may have a carbon structure that exhibits a $N_2$ desorption amount in the temperature range from 600° C. to 1,000° C. of $1.20 \times 10^{-5}$ mol/g or more in the TPD and a first/second nitrogen intensity ratio of 0.620 or more obtained by the XPS. In this case, the carbon structure of the catalyst of the present invention may be specified by appropriately combining: one of the above-mentioned threshold values for the $N_2$ desorption amount in the temperature range from 600° C. to 1,000° C.; and one of the above-mentioned threshold values for the first/second nitrogen intensity ratio.

Specifically, for example, the carbon structure of the catalyst of the present invention exhibits preferably a $N_2$ desorption amount in the temperature range from 600° C. to 1,000° C. of $1.50 \times 10^{-5}$ mol/g or more in the TPD and a first/second nitrogen intensity ratio of 0.700 or more obtained by the XPS, more preferably a $N_2$ desorption amount in the temperature range from 600° C. to 1,000° C. of $2.00 \times 10^{-5}$ mol/g or more in the TPD and a first/second nitrogen intensity ratio of 0.750 or more obtained by the XPS, still more preferably a $N_2$ desorption amount in the temperature range from 600° C. to 1,000° C. of $2.50 \times 10^{-5}$ mol/g or more in the TPD and a first/second nitrogen intensity ratio of 0.800 or more obtained by the XPS, and particularly preferably a $N_2$ desorption amount in the temperature range from 600° C. to 1,000° C. of $3.00 \times 10^{-5}$ mol/g or more in the TPD and a first/second nitrogen intensity ratio of 0.850 or more obtained by the XPS.

In addition, the catalyst of the present invention may have a carbon structure that exhibits a $N_2$ desorption amount in the temperature range from 800° C. to 1,000° C. of $0.750 \times 10^{-5}$ mol/g or more, a $N_2$ desorption amount in the temperature range from 600° C. to 1,000° C. of $1.20 \times 10^{-5}$ mol/g or more in the TPD and a first/second nitrogen intensity ratio of 0.620 or more obtained by the XPS. In this case, the carbon structure of the catalyst of the present invention may be specified by appropriately combining: one of the above-mentioned threshold values for the $N_2$ desorption amount in the temperature range from 800° C. to 1,000° C.; one of the above-mentioned threshold values for the $N_2$ desorption amount in the temperature range from 600° C. to 1,000° C.; and one of the above-mentioned threshold values for the first/second nitrogen intensity ratio.

Specifically, for example, the carbon structure of the catalyst of the present invention exhibits preferably a $N_2$ desorption amount in the temperature range from 800° C. to 1,000° C. of $1.00 \times 10^{-5}$ mol/g or more, a $N_2$ desorption amount in the temperature range from 600° C. to 1,000° C. of $1.50 \times 10^{-5}$ mol/g or more in the TPD, and a first/second nitrogen intensity ratio of 0.700 or more obtained by the XPS, more preferably a $N_2$ desorption amount in the temperature range from 800° C. to 1,000° C. of $1.50 \times 10^{-5}$ mol/g or more, a $N_2$ desorption amount in the temperature range from 600° C. to 1,000° C. of $2.00 \times 10^{-5}$ mol/g or more in the TPD, and a first/second nitrogen intensity ratio of 0.750 or more obtained by the XPS, still more preferably a $N_2$ desorption amount in the temperature range from 800° C. to 1,000° C. of $2.00 \times 10^{-5}$ mol/g or more, a $N_2$ desorption amount in the temperature range from 600° C. to 1,000° C. of $2.50 \times 10^{-5}$ mol/g or more in the TPD and a first/second nitrogen intensity ratio of 0.800 or more obtained by the XPS, and particularly preferably a $N_2$ desorption amount in the temperature range from 800° C. to 1,000° C. of $2.30 \times 10^{-5}$ mol/g or more, a $N_2$ desorption amount in the temperature range from 600° C. to 1,000° C. of $3.00 \times 10^{-5}$ mol/g or more in the TPD, and a first/second nitrogen intensity ratio of 0.850 or more obtained by the XPS.

In addition, the catalyst of the present invention may have a carbon structure that exhibits a zeta potential isoelectric point of pH 9.2 or more and a first/second nitrogen intensity ratio of 0.620 or more obtained by the XPS. In this case, the carbon structure of the catalyst of the present invention may be specified by appropriately combining: one of the above-mentioned threshold values for the zeta potential isoelectric point; and one of the above-mentioned threshold values for the first/second nitrogen intensity ratio.

Specifically, for example, the carbon structure of the catalyst of the present invention exhibits preferably a zeta potential isoelectric point of pH 9.2 or more and a first/second nitrogen intensity ratio of 0.700 or more obtained by the XPS, more preferably a zeta potential isoelectric point of pH 9.3 or more and a first/second nitrogen intensity ratio of 0.750 or more obtained by the XPS, still more preferably a zeta potential isoelectric point of pH 9.4 or more and a first/second nitrogen intensity ratio of 0.800 or more obtained by the XPS, and particularly preferably a zeta potential isoelectric point of pH 9.5 or more and a first/second nitrogen intensity ratio of 0.850 or more obtained by the XPS.

In addition, the catalyst of the present invention may have a carbon structure that exhibits a $N_2$ desorption amount in the temperature range from 800° C. to 1,000° C. of $0.750 \times 10^{-5}$ mol/g or more in the TPD, a zeta potential isoelectric point of pH 9.2 or more, and a first/second nitrogen intensity ratio of 0.620 or more obtained by the XPS. In this case, the carbon structure of the catalyst of the present invention may be specified by appropriately combining: one of the above-mentioned threshold values for the $N_2$ desorption amount in the temperature range from 800° C. to 1,000° C.; one of the above-mentioned threshold values for the zeta potential isoelectric point; and one of the above-mentioned threshold values for the first/second nitrogen intensity ratio.

Specifically, for example, the carbon structure of the catalyst of the present invention exhibits preferably a $N_2$ desorption amount in the temperature range from 800° C. to 1,000° C. of $1.00 \times 10^{-5}$ mol/g or more in the TPD, a zeta potential isoelectric point of pH 9.2 or more, and a first/second nitrogen intensity ratio of 0.700 or more obtained by the XPS, more preferably a $N_2$ desorption amount in the temperature range from 800° C. to 1,000° C. of $1.50 \times 10^{-5}$ mol/g or more in the TPD, a zeta potential isoelectric point of pH 9.3 or more, and a first/second nitrogen intensity ratio of 0.750 or more obtained by the XPS, still more preferably a $N_2$ desorption amount in the temperature range from 800° C. to 1,000° C. of $2.00 \times 10^{-5}$ mol/g or more in the TPD, a zeta potential isoelectric point of pH 9.4 or more, and a first/second nitrogen intensity ratio of 0.800 or more obtained by the XPS, and particularly preferably a $N_2$ desorption amount in the temperature range from 800° C. to 1,000° C. of $2.30 \times 10^{-5}$ mol/g or more in the TPD, a zeta potential isoelectric point of pH 9.5 or more, and a first/second nitrogen intensity ratio of 0.850 or more obtained by the XPS.

In addition, the catalyst of the present invention may have a carbon structure that exhibits a $N_2$ desorption amount in the temperature range from 600° C. to 1,000° C. of $1.20 \times 10^{-5}$ mol/g or more in the TPD, a zeta potential isoelectric point of pH 9.2 or more, and a first/second nitrogen intensity ratio of 0.620 or more obtained by the XPS. In this case, the carbon structure of the catalyst of the present invention may be specified by appropriately combining: one of the above-mentioned threshold values for the $N_2$ desorption amount in the temperature range from 600° C. to 1,000° C.; one of the above-mentioned threshold values for the zeta potential isoelectric point; and one of the above-mentioned threshold values for the first/second nitrogen intensity ratio.

Specifically, for example, the carbon structure of the catalyst of the present invention exhibits preferably a $N_2$ desorption amount in the temperature range from 600° C. to 1,000° C. of $1.50 \times 10^{-5}$ mol/g or more in the TPD, a zeta potential isoelectric point of pH 9.2 or more, and a first/second nitrogen intensity ratio of 0.700 or more obtained by the XPS, more preferably a $N_2$ desorption amount in the temperature range from 600° C. to 1,000° C. of $2.00 \times 10^{-5}$ mol/g or more in the TPD, a zeta potential isoelectric point of pH 9.3 or more, and a first/second nitrogen intensity ratio of 0.750 or more obtained by the XPS, still more preferably a $N_2$ desorption amount in the temperature range from 600° C. to 1,000° C. of $2.50 \times 10^{-5}$ mol/g or more in the TPD, a zeta potential isoelectric point of pH 9.4 or more, and a first/second nitrogen intensity ratio of 0.800 or more obtained by the XPS, and particularly preferably a $N_2$ desorption amount in the temperature range from 600° C. to 1,000° C. of $3.00\times10^{-5}$ mol/g or more in the TPD, a zeta potential isoelectric point of pH 9.5 or more, and a first/second nitrogen intensity ratio of 0.850 or more obtained by the XPS.

In addition, the catalyst of the present invention may have a carbon structure that exhibits a $N_2$ desorption amount in the temperature range from 800° C. to 1,000° C. of $0.750\times10^{-5}$ mol/g or more and a $N_2$ desorption amount in the temperature range from 600° C. to 1,000° C. of $1.20\times10^{-5}$ mol/g or more in the TPD, a zeta potential isoelectric point of pH 9.2 or more, and a first/second nitrogen intensity ratio of 0.620 or more obtained by the XPS. In this case, the carbon structure of the catalyst of the present invention may be specified by appropriately combining: one of the above-mentioned threshold values for the $N_2$ desorption amount in the temperature range from 800° C. to 1,000° C.; one of the above-mentioned threshold values for the $N_2$ desorption amount in the temperature range from 600° C. to 1,000° C.; one of the above-mentioned threshold values for the zeta potential isoelectric point; and one of the above-mentioned threshold values for the first/second nitrogen intensity ratio.

Specifically, for example, the carbon structure of the catalyst of the present invention exhibits preferably a $N_2$ desorption amount in the temperature range from 800° C. to 1,000° C. of $1.00\times10^{-5}$ mol/g or more, a $N_2$ desorption amount in the temperature range from 600° C. to 1,000° C. of $1.50\times10^{-5}$ mol/g or more in the TPD, a zeta potential isoelectric point of pH 9.2 or more, and a first/second nitrogen intensity ratio of 0.700 or more obtained by the XPS, more preferably a $N_2$ desorption amount in the temperature range from 800° C. to 1,000° C. of $1.50\times10^{-5}$ mol/g or more, a $N_2$ desorption amount in the temperature range from 600° C. to 1,000° C. of $2.00\times10^{-5}$ mol/g or more in the TPD, a zeta potential isoelectric point of pH 9.3 or more, and a first/second nitrogen intensity ratio of 0.750 or more obtained by the XPS, still more preferably a $N_2$ desorption amount in the temperature range from 800° C. to 1,000° C. of $2.00\times10^{-5}$ mol/g or more, a $N_2$ desorption amount in the temperature range from 600° C. to 1,000° C. of $2.50\times10^{-5}$ mol/g or more in the TPD, a zeta potential isoelectric point of pH 9.4 or more, and a first/second nitrogen intensity ratio of 0.800 or more obtained by the XPS, and particularly preferably a $N_2$ desorption amount in the temperature range from 800° C. to 1,000° C. of $2.30\times10^{-5}$ mol/g or more, a $N_2$ desorption amount in the temperature range from 600° C. to 1,000° C. of $3.00\times10^{-5}$ mol/g or more in the TPD, a zeta potential isoelectric point of pH 9.5 or more, and a first/second nitrogen intensity ratio of 0.850 or more obtained by the XPS.

The catalyst of the present invention may have a carbon structure that exhibits a ratio of the intensity of the first nitrogen peak that has a peak top within a range of a binding energy of 398.0±1.0 eV to an intensity of a peak (hereinafter referred to as "$C_{1s}$ peak") derived from a is orbital of a carbon atom (hereinafter referred to as "first nitrogen/$C_{1s}$ intensity ratio") of 0.017 or more, the first nitrogen peak being obtained by separating the $N_{1s}$ peak in the photoelectron spectrum obtained by the XPS. In this case, the first nitrogen/$C_{1s}$ intensity ratio exhibited by the carbon structure of the catalyst of the present invention is preferably 0.020 or more, particularly preferably 0.025 or more.

The fact that the carbon structure of the catalyst of the present invention exhibits a relatively high first nitrogen/$C_{1s}$ intensity ratio reflects that the amount of a particular nitrogen-containing functional group exhibiting the above-mentioned first nitrogen peak, which is contained in the carbon structure of the catalyst of the present invention, is large. While there is no particular limitation on an upper limit value of the above-mentioned first nitrogen/$C_{1s}$ intensity ratio of the catalyst of the present invention, the first nitrogen/$C_{1s}$ intensity ratio may be 0.150 or less.

The catalyst of the present invention may have a carbon structure that exhibits a ratio of a nitrogen atom concentration (atm %) to a carbon atom concentration (atm %) (hereinafter referred to as "N/C ratio") of 1.5% or more measured by the XPS. In this case, the N/C ratio exhibited by the carbon structure of the catalyst of the present invention is preferably 2.1% or more, more preferably 2.5% or more, and particularly preferably 2.8% or more.

The fact that the carbon structure of the catalyst of the present invention exhibits a N/C ratio equal to or more than the above-mentioned particular threshold value reflects that a large amount of a nitrogen-containing functional group is contained in the surface of the carbon structure, which contributes to, for example, excellent catalytic activity of the catalyst of the present invention. While there is no particular limitation on an upper limit value of the above-mentioned N/C ratio of the catalyst of the present invention, the N/C ratio may be 15.0% or less.

The catalyst of the present invention may have a carbon structure in which a peak is observed in the vicinity of a chemical shift of 150 ppm in a spectrum obtained by $^{13}C$ solid state nuclear magnetic resonance (hereinafter referred to as "$^{13}C$ solid state NMR") measurement.

In this case, in the spectrum obtained by the $^{13}C$ solid state NMR measurement of the catalyst of the present invention, a shoulder peak is observed in the vicinity of a chemical shift of 150 ppm (specifically, for example, within a range of 135 ppm or more and 170 ppm or less). Specifically, for example, when there are a plurality of inflection points within a range of a chemical shift of 135 ppm or more and 170 ppm or less after noise is removed by smoothing or the like in the spectrum obtained by the $^{13}C$ solid state NMR measurement, it is determined that a shoulder peak is observed.

It is considered that the fact that the carbon structure of the catalyst of the present invention exhibits a peak in the vicinity of a chemical shift of 150 ppm in the spectrum obtained by the $^{13}C$ solid state NMR measurement reflects that the carbon structure contains a large amount of a nitrogen-containing functional group, such as an azomethine (imine).

The catalyst of the present invention may contain a metal. In this case, there is no particular limitation on the metal contained in the catalyst of the present invention as long as the above-mentioned characteristics of the catalyst of the present invention are obtained, but the metal is preferably a transition metal. In addition, the catalyst of the present invention contains preferably two or more kinds of metals, more preferably two or more kinds of transition metals.

In this embodiment, the transition metal is a metal belonging to Groups III to XII in the periodic table, preferably a transition metal belonging to the fourth period of Groups III to XII in the periodic table. Specifically, the transition metal contained in the catalyst of the present invention may be, for example, one or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), lanthanoids (e.g., gadolinium (Gd)), and actinoids, or the group consisting of Sc, Ti, V, Cr, Mn, Fe, Co, Ni, Cu, Zn, Y, Zr, Nb, Mo, Ag, lanthanoids (e.g., Gd), and actinoids, or may be two or more kinds selected from the group.

In addition, the catalyst of the present invention contains preferably one or more kinds selected from the group consisting of Ti, Cr, Fe, Zn, and Gd, more preferably two or more kinds selected from the group. In this case, the catalyst of the present invention may contain one or more kinds selected from the group consisting of Fe and Zn or may contain Fe and Zn.

When the catalyst of the present invention contains the above-mentioned particular transition metal, the catalyst of the present invention may further contain another transition metal. That is, for example, when the catalyst of the present invention contains one or more kinds or two or more kinds of first transition metals selected from the group consisting of Ti, Cr, Fe, Zn, and Gd, the catalyst of the present invention may further contain one or more kinds of second transition metals selected from the group consisting of Sc, Ti, V, Cr, Mn, Fe, Co, Ni, Cu, Zn, Y, Zr, Nb, Mo, Ru, Rh, Pd, Ag, lanthanoids (e.g., Gd), and actinoids, or the group consisting of Sc, Ti, V, Cr, Mn, Fe, Co, Ni, Cu, Zn, Y, Zr, Nb, Mo, Ag, lanthanoids (e.g., Gd), and actinoids, which are different from the first transition metals.

In addition, the catalyst of the present invention may be free of platinum (Pt). The catalyst of the present invention may be free of one or more kinds selected from the group consisting of platinum (Pt), ruthenium (Ru), rhodium (Rh), palladium (Pd), iridium (Ir), gold (Au), and osmium (Os).

When the catalyst of the present invention contains a metal derived from a raw material for carbonization described later, the catalyst of the present invention contains the metal therein, which has been contained in the raw material for carbonization. Specifically, even when the catalyst of the present invention is produced by a method including subjecting a carbonized material to metal removal treatment as described later, a trace amount of the metal derived from the raw material remains in the catalyst of the present invention.

Specifically, for example, in the case where the catalyst of the present invention containing a metal has a particle shape, when the particle forming the catalyst of the present invention is cut, the metal is detected on a cross section of the particle exposed by cutting. The metal contained in the catalyst of the present invention may be detected, for example, by an inductively-coupled plasma (ICP) emission spectrophotometric method.

The catalyst of the present invention may have a specific surface area of 800 m$^2$/g or more measured by a BET method. In this case, the specific surface area of the catalyst of the present invention is preferably 1,000 m$^2$/g or more, particularly preferably 1,200 m$^2$/g or more.

The fact that the specific surface area of the catalyst of the present invention is equal to or more than the above-mentioned particular threshold value contributes to streamlining of a chemical reaction by the catalyst of the present invention, and to excellent catalytic activity. While there is no particular limitation on an upper limit value of the specific surface area of the catalyst of the present invention, the specific surface area may be 3,000 m$^2$/g or less.

The catalyst of the present invention may have a carbon structure that exhibits a nitrogen atom content of 1.5 wt % or more measured by elemental analysis based on a combustion method. In this case, it is preferred that the above-mentioned nitrogen atom content of the carbon structure of the catalyst of the present invention measured by the elemental analysis be 1.7 wt % or more.

The fact that the nitrogen atom content of the carbon structure of the catalyst of the present invention measured by elemental analysis is equal to or more than the above-mentioned particular threshold value reflects that a large amount of a nitrogen-containing functional group is contained in the carbon structure, which contributes to excellent catalytic activity of the catalyst of the present invention. While there is no particular limitation on an upper limit value of the nitrogen atom content of the catalyst of the present invention measured by the elemental analysis, the nitrogen atom content may be 15.0 wt % or less.

The catalyst of the present invention may have an average particle diameter of 1.0 µm or less. The fact that the average particle diameter of the catalyst of the present invention is equal to or less then the above-mentioned particular threshold value contributes to streamlining of a chemical reaction by the catalyst of the present invention, and to excellent catalytic activity of the catalyst of the present invention, and also contributes to streamlining in manufacturing of a battery electrode including the catalyst of the present invention. While there is no particular limitation on a lower limit value of the average particle diameter of the catalyst of the present invention, the average particle diameter may be 0.05 µm or more.

The catalyst of the present invention may have a maximum particle diameter of 1,000.0 µm or less. In this case, the maximum particle diameter of the catalyst of the present invention is, for example, preferably 50.0 µm or less, particularly preferably 10.0 µm or less. Specifically, for example, when the catalyst of the present invention is a carbon catalyst for a fuel cell (e.g., a carbon catalyst for a cathode or an anode of the fuel cell, preferably a carbon catalyst for a cathode of the fuel cell), the maximum particle diameter of the catalyst of the present invention is preferably 50.0 µm or less, particularly preferably 10.0 µm or less. In addition, in those cases, while there is no particular limitation on a minimum particle diameter of the catalyst of the present invention, the minimum particle diameter may be 0.001 µm or more.

The catalyst of the present invention is formed of a carbon material having catalytic activity by itself. The carbon material forming the catalyst of the present invention is, for example, a carbonized material obtained by carbonizing a raw material containing an organic substance as described later. In addition, when the catalyst of the present invention is formed of a carbonized material obtained by carbonizing a raw material containing an organic substance and a metal, the metal is contained in the carbon structure of the catalyst of the present invention. In this case, it is considered that the catalytic activity of the catalyst of the present invention is mainly achieved by an active point contained in the carbon structure itself rather than the metal. The foregoing is supported by the fact that, even when the catalyst of the present invention containing a metal derived from a raw material for carbonization is subjected to metal removal treatment for reducing the content of the metal, the catalytic activity of the catalyst of the present invention after the metal removal treatment is not substantially decreased compared to that before the metal removal treatment, and the fact that a carbon material in which a metal is carried on a surface of a carbonized material after carbonization, the carbonized material being obtained by carbonizing a raw material containing an organic substance but not containing a metal, does not have excellent catalytic activity, unlike the catalyst of the present invention. The catalytic activity of the catalyst of the present invention is, for example, oxidation activity and/or reduction activity, and more specifically, for example, oxygen reduction activity and/or hydrogen oxidation activity.

The catalyst of the present invention may be free of Pt or a rare metal, such as Pt, because the catalyst of the present invention has catalytic activity by itself. However, the present invention is not limited thereto, and the catalyst of the present invention may be used as a carrier for carrying the rare metal. In this case, the rare metal carried by the catalyst of the present invention is, for example, one or more kinds selected from the group consisting of Pt, Ru, Rh, Pd, Ir, Au, and Os.

Even when the catalyst of the present invention is used as a carrier for a rare metal, the catalyst of the present invention serving as a carrier that has not carried the rare metal (catalyst of the present invention before carrying the rare metal) is a carbon material having catalytic activity by itself, that is, a carbon catalyst.

There is no particular limitation on a production method for the catalyst of the present invention as long as the catalyst of the present invention having the above-mentioned characteristics is obtained. In this embodiment, a method including carbonizing a raw material containing an organic substance under pressure will be described.

The organic substance contained in the raw material is not particularly limited as long as the organic substance can be carbonized. Specifically, as the organic substance, for example, high-molecular-weight organic compounds (e.g., resins such as a thermosetting resin and/or a thermoplastic resin), and/or low-molecular-weight organic compounds are used. In addition, a biomass may be used as the organic substance.

As the organic substance, a nitrogen-containing organic substance is preferably used. The nitrogen-containing organic substance is not particularly limited as long as the nitrogen-containing organic substance is an organic substance containing an organic compound that contains a nitrogen atom in a molecule thereof. When the catalyst of the present invention is a carbonized product of a raw material containing the nitrogen-containing organic substance, the carbon structure of the catalyst of the present invention contains a nitrogen atom.

Specifically, for example, one or more kinds selected from the group consisting of polyacrylonitrile, a polyacrylonitrile-polyacrylic acid copolymer, a polyacrylonitrile-polymethyl acrylate copolymer, a polyacrylonitrile-polymethacrylic acid copolymer, a polyacrylonitrile-polymethacrylic acid-polymethallylsulfonic acid copolymer, a polyacrylonitrile-polymethyl methacrylate copolymer, a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type resins), a polyamideimide resin, pyrrole, polypyrrole, polyvinylpyrrole, 3-methylpolypyrrole, acrylonitrile, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylic acid ester, polymethacrylic acid ester, polymethacrylic acid, polyurethane, polyamide amine, and polycarbodiimide are used as the organic substance.

The content of the organic substance in the raw material is not particularly limited as long as the catalyst of the present invention is obtained, and may be, for example, 5 mass % or more and 90 mass % or less, preferably 10 mass % or more and 80 mass % or less.

The raw material for carbonization may further contain a metal. Specifically, in this case, the raw material containing an organic substance and a metal is carbonized under pressure. When the catalyst of the present invention is formed of a carbonized material obtained by carbonizing the raw material containing an organic substance and a metal, the catalyst of the present invention contains the metal.

The metal contained in the raw material (that is, the metal contained in the catalyst of the present invention) is preferably a transition metal. In addition, the raw material contains preferably two or more kinds of metals, more preferably two or more kinds of transition metals.

In this embodiment, the transition metal is a metal belonging to Groups III to XII in the periodic table, preferably a transition metal belonging to the fourth period of Groups III to XII in the periodic table. Specifically, the transition metal contained in the raw material may be, for example, one or more kinds selected from the group consisting of Sc, Ti, V, Cr, Mn, Fe, Co, Ni, Cu, Zn, Y, Zr, Nb, Mo, Ru, Rh, Pd, Ag, lanthanoids (e.g., Gd), and actinoids, or the group consisting of Sc, Ti, V, Cr, Mn, Fe, Co, Ni, Cu, Zn, Y, Zr, Nb, Mo, Ag, lanthanoids (e.g., Gd), and actinoids, or may be two or more kinds selected from the group.

In addition, the raw material contains preferably one or more kinds selected from the group consisting of Ti, Cr, Fe, Zn, and Gd, more preferably two or more kinds selected from the group. In this case, the raw material may contain one or more kinds selected from the group consisting of Fe and Zn or may contain Fe and Zn.

When the raw material contains the above-mentioned particular transition metal, the raw material may further contain another transition metal. That is, for example, when the raw material contains one or more kinds of first transition metals selected from the group consisting of Ti, Cr, Fe, Zn, and Gd, the raw material may further contain one or more kinds of second transition metals selected from the group consisting of Sc, Ti, V, Cr, Mn, Fe, Co, Ni, Cu, Zn, Y, Zr, Nb, Mo, Ru, Rh, Pd, Ag, lanthanoids (e.g., Gd), and actinoids, or the group consisting of Sc, Ti, V, Cr, Mn, Fe, Co, Ni, Cu, Zn, Y, Zr, Nb, Mo, Ag, lanthanoids (e.g., Gd), and actinoids, which are different from the first transition metals.

In addition, the raw material may be free of Pt. The raw material may be free of one or more kinds selected from the group consisting of Pt, Ru, Rh, Pd, Ir, Au, and Os.

As the metal contained in the raw material, a simple substance of the metal and/or a compound of the metal is used. As the metal compound, one or more kinds selected from the group consisting of, for example, a metal salt, a metal oxide, a metal hydroxide, a metal nitride, a metal sulfide, a metal carbide, and a metal complex may be used.

While there is no particular limitation on a metal content in the raw material (total content of two or more kinds of metals when the two or more kinds of metals are used) as long as the content falls within a range in which the catalyst of the present invention is obtained, the content may be, for example, 1 mass % or more and 90 mass % or less, preferably 2 mass % or more and 80 mass % or less.

Carbonization is performed by heating the raw material and keeping the raw material at a temperature at which the raw material is carbonized (hereinafter referred to as "carbonizing temperature") under pressure. The carbonizing temperature is not particularly limited as long as the raw material is carbonized. The carbonizing temperature is, for example, 300° C. or more. Specifically, in this case, the raw material containing an organic substance is carbonized at a temperature of 300° C. or more under pressure.

In addition, the carbonizing temperature may be set to, for example, 700° C. or more, preferably 900° C. or more, more preferably 1,000° C. or more, and particularly preferably 1,100° C. or more. There is no particular limitation on an upper limit value of the carbonizing temperature. The carbonizing temperature is, for example, 3,000° C. or less.

A temperature increase rate up to the carbonizing temperature is, for example, 0.5° C./min or more and 300° C./min or less. The period of time for keeping the raw material at the carbonizing temperature is, for example, 1 second or more and 24 hours or less, preferably 5 minutes or more and 24 hours or less. It is preferred that the carbonization be performed in an inert gas atmosphere, such as a nitrogen atmosphere. Specifically, for example, it is preferred that the carbonization be performed under the flow of inert gas, such as nitrogen gas.

There is no particular limitation on the pressure of the atmosphere in which the carbonization is performed as long as the pressure is higher than an atmospheric pressure. The pressure is, for example, a pressure of 0.05 MPa or more in terms of a gauge pressure. Further, the pressure of the atmosphere in which the carbonization is performed in terms of a gauge pressure may be set to 0.15 MPa or more, preferably 0.20 MPa or more, more preferably 0.40 MPa or more, and particularly preferably 0.50 MPa or more. Specifically, in those cases, the production method includes carbonizing the raw material containing an organic substance under a pressure equal to or more than the above-mentioned threshold value (MPa) in terms of a gauge pressure.

The production method for the catalyst of the present invention may include subjecting a carbonized material obtained by carbonizing a raw material containing an organic substance to further treatment. Specifically, for example, the carbonized material may be subjected to ammonia treatment. In this case, for example, the raw material containing an organic substance is carbonized under pressure, and the carbonized material obtained by the carbonization is subjected to ammonia treatment.

There is no particular limitation on the ammonia treatment as long as the ammonia treatment includes bringing the carbonized material into contact with ammonia. Specifically, the ammonia treatment is, for example, treatment including heating the carbonized material in an ammonia-containing gas atmosphere.

While there is no particular limitation on the ammonia content of the ammonia-containing gas as long as the ammonia content falls within a range in which the effect of the ammonia treatment is obtained, the ammonia content may be, for example, 0.1 vol % or more, 1.0 vol % or more, or 3.0 vol % or more.

While there is no particular limitation on the temperature for heating the carbonized material during the ammonia treatment as long as the temperature falls within a range in which the effect of the ammonia treatment is obtained, the temperature may be, for example, 300° C. or more, preferably 500° C. or more, particularly preferably 700° C. or more. While there is no particular limitation on an upper limit value of the heating temperature, the heating temperature may be, for example, 1,300° C. or less, preferably 1,000° C. or less. The range of the heating temperature during the ammonia treatment is specified by appropriately combining: one of the above-mentioned lower limit values; and one of the above-mentioned upper limit values.

In addition, the carbonized material may be subjected to metal removal treatment. In this case, for example, the raw material containing an organic substance is carbonized under pressure, and then the carbonized material obtained by the carbonization is subjected to the metal removal treatment. In addition, for example, the raw material containing an organic substance is carbonized under pressure, and then the carbonized material obtained by the carbonization is subjected to the metal removal treatment, and after that, the carbonized material after the metal removal treatment is subjected to the ammonia treatment. The metal removal treatment is treatment including reducing the amount of the metal derived from the raw material contained in the carbonized material. The metal removal treatment is, for example, washing treatment using an acid and/or electrolytic treatment.

An electrode of the present invention includes the above-mentioned catalyst of the present invention. Specifically, the electrode of the present invention is, for example, a battery electrode carrying the catalyst of the present invention. Specifically, the electrode of the present invention is, for example, a battery electrode including an electrode base material and the catalyst of the present invention carried on the electrode base material.

Here, as described above, the catalyst of the present invention has catalytic activity by itself, and hence the electrode of the present invention may be free of Pt. The electrode of the present invention may be free of the above-mentioned rare metal, such as Pt. However, the present invention is not limited thereto. The electrode of the present invention may include, for example, the catalyst of the present invention serving as a carrier for carrying the rare metal and the rare metal carried by the catalyst of the present invention.

The electrode of the present invention is, for example, an electrode of a fuel cell (e.g., a polymer electrolyte fuel cell), an air cell, a water electrolytic cell (e.g., a polymer electrolyte water electrolytic cell), a redox flow cell, or a halogen cell. In addition, the electrode of the present invention is, for example, a cathode or an anode, preferably a cathode. Specifically, the electrode of the present invention is a cathode or an anode of a fuel cell, an air cell, a water electrolytic cell, a redox flow cell, or a halogen cell, preferably a fuel cell cathode, an air cell cathode, a water electrolytic cell cathode, a redox flow cell cathode, or a halogen cell cathode.

A battery of the present invention includes the above-mentioned battery electrode. Specifically, the battery of the present invention is, for example, a fuel cell (e.g., a polymer electrolyte fuel cell), an air cell, a redox flow cell, or a halogen cell including the electrode of the present invention. The battery of the present invention may include a membrane/electrode assembly (MEA) including the electrode of the present invention. The battery of the present invention is a battery including the electrode of the present invention as a cathode or an anode, preferably a battery including the electrode of the present invention as a cathode. Specifically, the battery of the present invention is a fuel cell, an air cell, a redox flow cell, or a halogen cell including the electrode of the present invention as a cathode or an anode, preferably a fuel cell, an air cell, a redox flow cell, or a halogen cell including the electrode of the present invention as a cathode.

Next, specific Examples according to this embodiment will be described.

EXAMPLES

Example 1

1.0 g of polyacrylonitrile (PAN), 1.0 g of 2-methylimidazole, 6.0 g of zinc chloride ($ZnCl_2$), and 30 g of dimethylformamide were mixed. The solvent was removed from the obtained mixture by drying. The dried mixture was heated in the atmosphere to be infusibilized at 250° C.

25 g of the infusibilized mixture, 0.03 g of iron (III) chloride hexahydrate ($FeCl_3.6H_2O$), and 105 g of dimethylformamide were mixed. The solvent was removed from the obtained mixture by drying. The dried mixture was heated and kept at 1,100° C. under a gauge pressure of 0.9 MPa in a nitrogen atmosphere to be carbonized.

Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed. Further, the carbonized material after the metal removal treatment was pulverized with a pulverizer until the average particle diameter thereof became 1 μm or less.

The pulverized carbonized material was heated and kept at 900° C. for 1 hour in an atmosphere in which 100% ammonia gas was circulated at 0.3 L/min. After that, the ammonia gas was substituted with nitrogen, and the carbonized material was kept at 500° C. for 10 minutes in a nitrogen atmosphere. Then, the carbonized material cooled by natural cooling in the nitrogen atmosphere was obtained as a carbon catalyst of Example 1.

Example 2

A carbon catalyst of Example 2 was obtained in the same manner as in Example 1 except that, after the carbonized material was heated and kept at 900° C. for 1 hour in the ammonia gas atmosphere, the carbonized material was cooled in the ammonia gas without the ammonia gas being substituted with nitrogen, instead of being cooled in the nitrogen atmosphere.

Example 3

The carbon catalyst obtained in Example 2 was heated under ordinary pressure in the nitrogen atmosphere and kept at 600° C. for 30 minutes, to thereby obtain a carbon catalyst of Example 3.

Example 4

A carbon catalyst of Example 4 was obtained in the same manner as in Example 1 except for the following. Before the pulverized carbonized material was heated in the ammonia gas, dilute nitric acid was added to the carbonized material, followed by stirring. Then, the suspension containing the carbonized material was filtered through use of a membrane filter, and further, nitric acid treatment for washing the carbonized material with distilled water was performed until the filtrate became neutral. After that, the carbonized material treated with nitric acid was heated at 300° C. in the nitrogen atmosphere, and then heated in the ammonia gas.

Example 5

A carbon catalyst of Example 5 was obtained in the same manner as in Example 1 except that the pulverized carbonized material was heated in the ammonia gas at 800° C. instead of 900° C.

Example 6

A carbon catalyst of Example 6 was obtained in the same manner as in Example 2 except that a mixture further containing 0.018 g of chromium chloride hexahydrate ($CrCl_3.6H_2O$) was prepared before the infusibilization, and the mixture was infusibilized.

Example 7

A carbon catalyst of Example 7 was obtained in the same manner as in Example 1 except that a mixture further containing 0.06 g of boric acid ($B(HO)_3$) was prepared before the infusibilization, and the mixture was infusibilized.

Example 8

A carbon catalyst of Example 8 was obtained in the same manner as in Example 1 except that 2.0 g of 2-methylimidazole was used instead of 1.0 g of 2-methylimidazole.

Example 9

A carbon catalyst of Example 9 was obtained in the same manner as in Example 1 except that a mixture further containing 0.69 g of germanium (IV) chloride ($GeCl_4$) was prepared before the infusibilization, and the mixture was infusibilized.

Example 10

A carbon catalyst of Example 10 was obtained in the same manner as in Example 1 except that a mixture further containing 0.06 g of lead nitrate hexahydrate ($Pb(NO_3)_2.6H_2O$) was prepared before the infusibilization, and the mixture was infusibilized.

Example 11

A carbon catalyst of Example 11 was obtained in the same manner as in Example 1 except that a mixture further containing 0.075 g of gadolinium nitrate hexahydrate ($Gd(NO_3)_3.6H_2O$) was prepared before the infusibilization, and the mixture was infusibilized.

Example 12

A carbon catalyst of Example 12 was obtained in the same manner as in Example 1 except that a mixture further containing 1.06 g of bismuth (III) chloride ($BiCl_3$) was prepared before the infusibilization, and the mixture was infusibilized.

Example 13

A carbon catalyst of Example 13 was obtained in the same manner as in Example 1 except that a mixture further containing 0.03 g of titanium nitride (TiN) was prepared before the infusibilization, and the mixture was infusibilized.

Example 14

A carbon catalyst of Example 14 was obtained in the same manner as in Example 1 except that a mixture further containing 0.48 g of silver chloride (AgCl) was prepared before the infusibilization, and the mixture was infusibilized.

Comparative Example 1

1.0 g of polyacrylonitrile (PAN), 1.0 g of 2-methylimidazole, 6.0 g of zinc chloride ($ZnCl_2$), and 30 g of dimethylformamide were mixed. The solvent was removed from the obtained mixture by drying. The dried mixture was heated in the atmosphere to be infusibilized at 250° C.

25 g of the infusibilized mixture, 0.03 g of iron (III) chloride hexahydrate ($FeCl_3.6H_2O$), and 105 g of dimethylformamide were mixed. The solvent was removed from the obtained mixture by drying. The dried mixture was heated and kept at 1,100° C. under ordinary pressure in a nitrogen atmosphere to be carbonized.

Dilute hydrochloric acid was added to the carbonized material obtained by the carbonization, followed by stirring for 30 minutes. After that, the carbonized material was precipitated to remove the solvent. This treatment was repeated several times, and then, distilled water was added to the resultant, followed by stirring. The suspension containing the carbonized material was filtered through use of a membrane filter, and the carbonized material was washed with distilled water until the filtrate became neutral. Thus, metal removal treatment through washing using an acid was performed. Further, the carbonized material after the metal removal treatment was pulverized with a pulverizer until the average particle diameter thereof became 1 μm or less. Thus, the pulverized carbonized material was obtained as a carbon catalyst of Comparative Example 1.

Comparative Example 2

A carbon catalyst of Comparative Example 2 was obtained in the same manner as in Example 1 except that the pulverized carbonized material was obtained directly as a carbon catalyst without performing the heating treatment in the ammonia gas atmosphere and subsequent treatments.

Comparative Example 3

The carbon catalyst obtained in Example 2 was heated under ordinary pressure in the nitrogen atmosphere and kept at 1,000° C. for 30 minutes, to thereby obtain a carbon catalyst of Comparative Example 3.

Comparative Example 4

A carbon catalyst of Comparative Example 4 was obtained in the same manner as in Comparative Example 1 except that a mixture further containing 0.018 g of chromium chloride hexahydrate ($CrCl_3.6H_2O$) was prepared before the infusibilization, and the mixture was infusibilized.

Comparative Example 5

A carbon catalyst of Comparative Example 5 was obtained in the same manner as in Comparative Example 2 except that a mixture further containing 0.018 g of chromium chloride hexahydrate ($CrCl_3.6H_2O$) was prepared before the infusibilization, and the mixture was infusibilized.

Comparative Example 6

The carbon catalyst obtained in Comparative Example 1 was heated and kept at 900° C. for 1 hour in an atmosphere in which 100% ammonia gas was circulated at 0.3 L/min. After that, the ammonia gas was substituted with nitrogen, and the carbon catalyst was kept at 500° C. for 10 minutes in a nitrogen atmosphere. Then, the carbon catalyst cooled in the nitrogen atmosphere was obtained as a carbon catalyst of Comparative Example 6.

Next, each of the carbon catalysts obtained as described above was subjected to analysis as described below. The weight of a used carbon catalyst described in the description of each of the following analyses refers to the weight of the carbon catalyst that has been subjected to heat treatment at 80° C. for 3 hours in vacuum.

[Temperature Programmed Desorption Method]

The carbon catalyst was installed in a temperature programmed desorption device (manufactured by Microtrac-BEL Corporation), and a carrier gas (He) was circulated at 20 mL/min to heat the carbon catalyst. The desorbed gas was measured with a quadrupole mass spectrometer (QMS).

Specifically, first, pretreatment (desorption of a catalyst surface functional group by heat treatment) of the carbon catalyst was performed. Specifically, first, the carbon catalyst was subjected to pretreatment by being heated to 600° C. at a temperature increase rate of 10° C./min in a nitrogen atmosphere and kept at 600° C. for 30 minutes. 0.05 g of the carbon catalyst after the pretreatment was filled into a center portion of a reaction tube made of quartz and set in a temperature programmed desorption device. Helium (He) gas was circulated through the device, and the inside of the device was kept at 25° C. for 120 minutes, to thereby stabilize the device. After that, the carbon catalyst was subjected to heat treatment by heating the carbon catalyst again so that the temperature was increased to 1,000° C. at a temperature increase rate of 10° C./min, to thereby desorb the functional group on the surface thereof.

Next, the carbon catalyst was subjected to heat treatment to measure the amount of nitrogen ($N_2$) to be desorbed. Specifically, the temperature of the inside of the device was increased again to 600° C. at a temperature increase rate of 10° C./min, and then increased from 600° C. to 1,000° C. During the increase in temperature from 600° C. to 1,000° C., nitrogen generated by desorption of a nitrogen-containing compound was detected at a mass number of 14 while helium (He) gas was circulated at 20 mL/min (when amass number of 28 was used, gas such as CO and $C_2H_4$ was also contained (in particular, CO was mainly contained) in addition to $N_2$, and hence the mass number of 14 was used). A spectrum thus obtained was first subjected to baseline correction, and after that, a correlation between the temperature (horizontal axis) and the detection intensity (vertical axis) was recorded.

Then, integral values of detection intensities (detection intensity areas) of nitrogen within each of a temperature range of from 600° C. to 1,000° C., a temperature range of from 800° C. to 1,000° C., and a temperature range of from 600° C. to 800° C. were calculated, to thereby determine a release amount of nitrogen desorbed within each of the temperature ranges.

Meanwhile, a calibration curve representing a correlation between the release amount of nitrogen and the detection intensity area was obtained through use of nitrogen gas as a reference gas. Then, the desorption amount of nitrogen from the carbon catalyst (release amount per unit weight of the carbon catalyst) was determined by dividing a value quantified based on the detection intensity area obtained by the measurement and the calibration curve by the amount of the carbon catalyst used in the measurement.

The TPD measurement results of nitrogen (mass number: 14) of the carbon catalyst obtained in Example 4 are shown in FIG. 1 as an example of a method of determining the detection intensity area. In FIG. 1, the horizontal axis represents a reaction tube temperature (° C.), and the vertical axis represents a measurement intensity (μV) of a quadrupole mass spectrometer. In a profile shown in FIG. 1, the area of a hatched region was obtained as the detection intensity area of nitrogen by integration.

[Zeta Potential]

A zeta potential isoelectric point of the carbon catalyst was measured by electrophoresis through use of a zeta potential measurement device (Zetasizer nano ZS (electrophoresis), manufactured by Malvern Instruments Ltd.) and a capillary cell (disposable zeta potential measurement cell). Specifically, 0.1 g of the carbon catalyst was collected in a 50 mL beaker. Several drops of pure water were added thereto, and the mixture was sufficiently stirred. Further, 30 mL of pure water was added to the mixture drop by drop, and the resultant was sufficiently stirred. After that, the resultant was irradiated with ultrasonic waves (100 W, 5 minutes) and stirred with a stirrer for about 10 minutes, to thereby prepare a suspension containing the carbon catalyst. Pure water was added to the suspension to prepare a suspension including 0.1 wt % of the carbon catalyst, and the suspension was diluted with pure water so that the value of an attenuator became optimum (attenuation index: 6 to 9) with reference to JIS R 1638:1999 "Test methods of iso-electric point of fine ceramic powders", and the pH of the diluted suspension was measured.

The pH of the suspension was adjusted within a range of from 2.0 to 11.0 in increments of 1.0 through use of a sodium hydroxide aqueous solution and hydrochloric acid. The zeta potential was measured by collecting the suspension having a pH adjusted in a cell (n=2). As a refractive index, a dielectric constant, and a viscosity of a solvent, numerical values for those of water were used.

[X-Ray Photoelectron Spectroscopy]

The carbon catalyst was analyzed by the XPS. Specifically, a photoelectron spectrum from each core level of a carbon atom and a nitrogen atom on the surface of the carbon catalyst was measured through use of an X-ray photoelectron spectroscope (AXIS Nova, manufactured by Kratos). As an X-ray source, an AlKα line (10 mA, 15 kV, Pass energy: 40 eV) was used. In the obtained photoelectron spectrum, binding energy was corrected so that the peak top of the $C_{1s}$ peak derived from the is orbital of the carbon atom was located at 284.5 eV.

In the photoelectron spectrum, the $N_{1s}$ peak derived from the 1s orbital of the nitrogen atom was separated into a first nitrogen peak having a peak top within a range of a binding energy of from 397 eV to 399 eV, a second nitrogen peak having a peak top within a range of a binding energy of from 399.5 eV to 401.5 eV, and a third nitrogen peak having a peak top within a range of a binding energy of from 401 eV to 403 eV.

A first/second nitrogen intensity ratio was determined by dividing the intensity of the peak top of the first nitrogen peak by the intensity of the peak top of the second nitrogen peak. In addition, a first nitrogen/$C_{1s}$ intensity ratio was determined by dividing the intensity of the peak top of the first nitrogen peak by the intensity of the peak top of the $C_{1s}$ peak.

The peak separation was performed as follows. Specifically, first, the obtained photoelectron spectrum was subjected to baseline correction. In the photoelectron spectrum after the baseline correction, the first nitrogen peak observed in the vicinity of 398.0 eV, the second nitrogen peak observed in the vicinity of 400.5 eV, and the third nitrogen peak observed in the vicinity of 402.0 eV were each expressed by a Gauss function represented by the following expression: $G_n = A_n \cdot \exp(-B_n(x-C_n)^2)$ to be identified. In the expression, x corresponding to the horizontal axis represents binding energy (eV), and $A_n$, $B_n$, and $C_n$ are variables. $C_n$ for the first nitrogen peak and $C_n$ for the second nitrogen peak were each determined so as to fall within a range of ±1.0 eV of the position of the peak top.

$A_n$, $B_n$, and $C_n$ for each peak were determined through use of a least-square method or by solving an optimization problem. Specifically, the peak separation was performed so that a square sum of a difference between the sum of the Gaussian functions $G_n$ of the peaks and the photoelectron spectrum after the baseline correction became a minimum value.

Figure 2A:
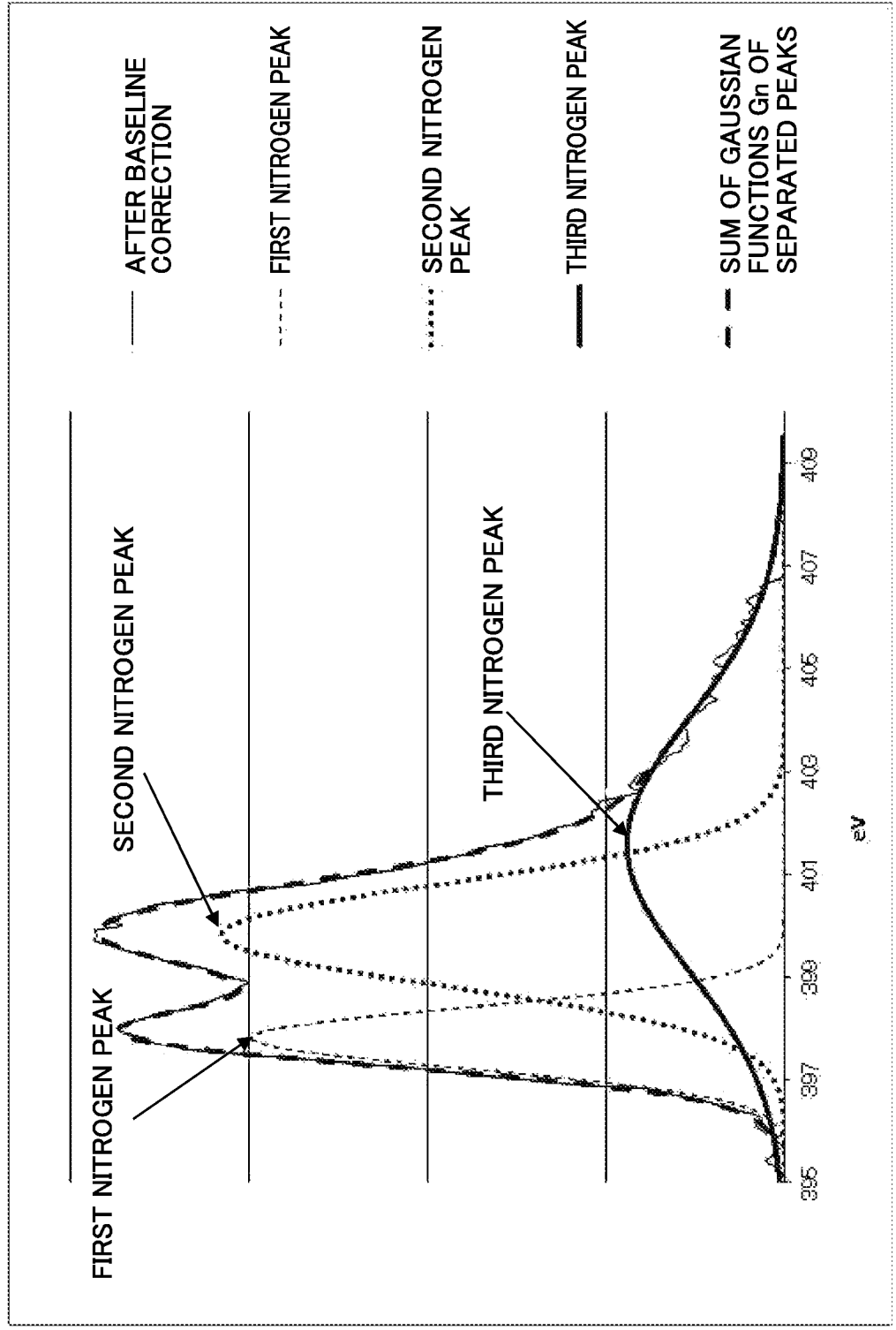
FIG. 2A is an explanatory diagram for showing results obtained by separating a peak derived from a 1s orbital of a nitrogen atom in a photoelectron spectrum obtained by X-ray photoelectron spectroscopy of a carbon catalyst of Example 2 according to one embodiment of the present invention.
Figure 2B:
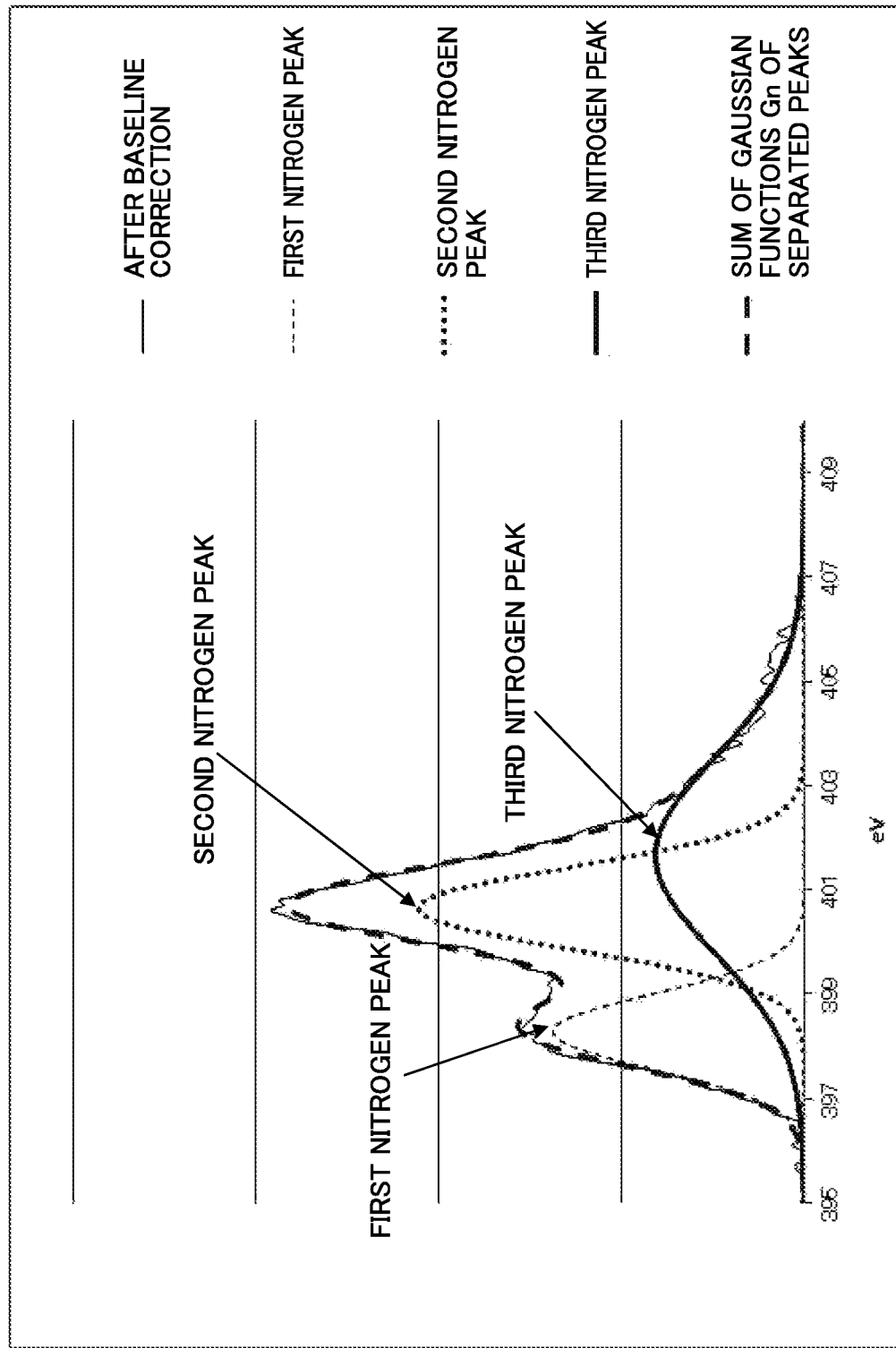
FIG. 2B is an explanatory diagram for showing results obtained by separating a peak derived from a 1s orbital of a nitrogen atom in a photoelectron spectrum obtained by X-ray photoelectron spectroscopy of a carbon catalyst of Comparative Example 2.

As an example of the peak separation, a photoelectron spectrum obtained by the XPS of the carbon catalyst obtained in Example 2 is shown in FIG. 2A, and a photoelectron spectrum obtained by the XPS of the carbon catalyst obtained in Comparative Example 2 is shown in FIG. 2B.

In each of FIG. 2A and FIG. 2B, the horizontal axis represents the binding energy (eV); the vertical axis represents the intensity; a thin solid line represents the $N_{1s}$ peak after the baseline correction; a thin dotted line represents the first nitrogen peak; a thick dotted line represents the second nitrogen peak; a thick solid line represents the third nitrogen peak; and a thick broken line represents a sum of the Gauss functions $G_n$ of the separation peaks (first nitrogen peak, second nitrogen peak, and third nitrogen peak obtained by the peak separation).

As shown in FIG. 2A and FIG. 2B, through the above-mentioned peak separation, the $N_{1s}$ peak was separated into the first nitrogen peak, the second nitrogen peak, and the third nitrogen peak in the photoelectron spectrum.

In addition, the element concentrations (atm %) of the nitrogen atom and the carbon atom on the surface of the carbon catalyst were determined based on a peak area and a detection sensitivity coefficient of each spectrum. Then, a value obtained by dividing the nitrogen atom concentration (atm %) by the carbon atom concentration (atm %) was multiplied by 100, to thereby calculate a N/C ratio (%).

[Solid State Nuclear Magnetic Resonance]

The carbon catalyst was subjected to $^{13}C$ solid state NMR measurement. Specifically, measurement was performed by a CP/MAS method under the conditions of a 4 mm WVT probe, MASR of 10 kHz, a repetition time of 10 seconds, and a number of scans of 10,240 through use of a solid state NMR measurement device (AVANCE III HD, manufactured by Bruker BioSpin).

Then, noise was removed by smoothing or the like in the spectrum obtained by the $^{13}C$ solid state NMR measurement. After that, it was determined whether or not a peak was observed in the vicinity of a chemical shift of 150 ppm based on whether or not a shoulder peak was observed within a range of a chemical shift of 135 ppm or more and 170 ppm or less.

[Specific Surface Area]

A specific surface area of the carbon catalyst was measured by a BET method using nitrogen gas through use of a specific surface area/pore distribution measurement device (Tristar 3000, manufactured by Shimadzu Corporation). Specifically, first, 0.1 g of the carbon catalyst was kept at 100° C. and $6.7 \times 10^{-2}$ Pa for 3 hours, to thereby remove moisture adsorbing to the carbon catalyst. Then, a specific surface area ($m^2/g$) of the carbon catalyst was obtained from a nitrogen adsorption isotherm at 77 K by the BET method. The nitrogen adsorption isotherm at 77 K was obtained by measuring a change in nitrogen adsorption amount to the carbon catalyst in association with a change in pressure of the nitrogen gas at a temperature of 77 K.

[Elemental Analysis]

The carbon catalyst was subjected to elemental analysis. Specifically, a nitrogen content of the carbon catalyst was measured by a combustion method through use of an organic trace elemental analysis device (2400II, manufactured by PerkinElmer Co., Ltd.). 2 mg of the carbon catalyst was analyzed through use of helium as carrier gas under the conditions of a combustion tube temperature of 980° C. and a reduction tube temperature of 640° C. Then, a value obtained by dividing the weight of nitrogen by the total weight of the carbon catalyst was multiplied by 100, to thereby calculate a nitrogen atom content (wt %).

[Average Particle Diameter]

The carbon catalyst was measured for an average particle diameter. Specifically, a particle diameter of the carbon catalyst was measured by a laser diffraction method through use of a nanoparticle diameter distribution measurement device (SALD-7100H, manufactured by Shimadzu Corporation). More specifically, first, one drop of a surfactant was added to 10 mg of the carbon catalyst, and 40 g of distilled water was added to the mixture, to thereby prepare a suspension. After that, the suspension was subjected to homogenizer treatment for 20 minutes to prepare a dispersion. The prepared dispersion was dropped to a flow cell in which distilled water was circulated until a maximum value of a diffraction/scattering light intensity became 50±5, to thereby measure a particle diameter. A median diameter (d50) determined from the obtained particle diameter distribution (volume distribution) was obtained as an average particle diameter. Out of particle diameters in the obtained particle diameter distribution (volume distribution) each having a frequency (%) of 0.001 or more, a maximum value was defined as a maximum particle diameter, and a minimum value was defined as a minimum particle diameter.

[Catalytic Activity]

The carbon catalyst was evaluated for catalytic activity through use of a rotating ring disk electrode device (RRDE-3 A rotating ring disk electrode device ver. 1.2, manufactured by BAS Inc.) and a dual electrochemical analyzer (CHI700C, manufactured by ALS Corporation). Specifically, first, a tripolar rotating ring disk electrode device including a working electrode containing the carbon catalyst was manufactured. Specifically, 5 mg of the carbon catalyst, 50 µL of 5% Nafion (trademark) (Nafion manufactured by Sigma-Aldrich, perfluorinated ion exchange resin, 5% solution (product number: 510211)), 400 µL of water, and 100 µL of isopropyl alcohol were mixed to prepare a slurry. Then, the slurry was subjected to ultrasonic treatment for 10 minutes, followed by homogenizer treatment for 2 minutes. The obtained slurry was applied onto a working electrode (ring disk electrode for RRDE-3A, platinum ring-gold disk electrode, disk diameter of 4 mm, manufactured by BAS Inc.) so that the application amount of the carbon catalyst became 0.1 mg/cm$^2$, followed by drying, to thereby manufacture a working electrode containing the carbon catalyst.

In addition, a platinum electrode (Pt counter electrode of 23 cm, manufactured by BAS Inc.) was used as a counter electrode, and a reversible hydrogen electrode (RHE) (storage type reversible hydrogen electrode manufactured by EC Frontier Co., Ltd.) was used as a reference electrode. Thus, a rotating ring disk electrode device including the working electrode containing the carbon catalyst, the platinum electrode serving as the counter electrode, and the reversible hydrogen electrode (RHE) serving as the reference electrode was obtained. In addition, as an electrolytic solution, a 0.1 M perchloric acid aqueous solution was used.

The catalytic activity was measured through use of the above-mentioned rotating ring disk electrode device. Specifically, linear sweep voltammetry ($N_2$-LSV) in a nitrogen atmosphere and linear sweep voltammetry ($O_2$-LSV) in an oxygen atmosphere were performed through use of the tripolar rotating ring disk electrode device including the working electrode containing the carbon catalyst.

In the $N_2$-LSV, first, nitrogen bubbling was performed for 10 minutes to remove oxygen in the electrolytic solution. Then, the electrodes were rotated at a rotation speed of 1,600 rpm, and a current density was recorded as a function of a potential when potential sweep was performed at a sweep speed of 20 mV/sec.

In the $O_2$-LSV, further, oxygen bubbling was performed for 10 minutes, to thereby fill saturated oxygen into the electrolytic solution. After that, the electrodes were rotated at a rotation speed of 1,600 rpm, and a current density was recorded as a function of a potential when potential sweep was performed at a sweep speed of 20 mV/sec ($O_2$-LSV). Then, the $N_2$-LSV was subtracted from the $O_2$-LSV to obtain an oxygen reduction voltammogram. In the obtained oxygen reduction voltammogram, signs were assigned to numerical values so that a reduction current had a negative value, and an oxidation current had a positive value.

As an indicator for indicating the catalytic activity (initial activity) of the carbon catalyst at a time of the start of a durability test described below, a voltage (oxygen reduction-starting potential $E_{O2}$) (V vs. NHE) at a time when a reduction current of $-10$ µA/cm$^2$ flowed and a current density $i_{0.7}$ (mA/cm$^2$) at a time when a voltage of 0.7 V (vs. NHE) was applied were recorded from the oxygen reduction voltammogram thus obtained.

[Power Generation Test and Durability Test]

A battery cathode having a catalyst layer containing the carbon catalyst formed therein was manufactured. Specifically, first, 0.25 g of the carbon catalyst produced as described above, an electrolyte solution, and 25 g of a ball were loaded into a pot and mixed with a ball mill at 200 rpm for 50 minutes, to thereby obtain a slurry-like composition for a catalyst layer containing the carbon catalyst uniformly dispersed therein.

The obtained slurry-like composition for a catalyst layer was applied onto a region having an area of 5 cm$^2$ of a gas diffusion layer ("29BC", manufactured by SGL Carbon Co., Ltd.) (2.3 cm×2.3 cm) so that the content of the carbon catalyst per unit area of a battery electrode became 1.5 mg/cm$^2$, followed by drying, to thereby form a catalyst layer on the gas diffusion layer. Thus, a battery electrode having the catalyst layer containing the carbon catalyst formed therein was obtained.

Next, the obtained battery electrode was subjected to a current retention test (durability test). Specifically, the battery electrode including the catalyst layer (positive electrode catalyst layer) manufactured as described above was used as a positive electrode. Meanwhile, a negative electrode was manufactured as described below. 0.5 g of Pt/C, 10 g of a 5 wt % Nafion (trademark) solution (manufactured by Sigma-Aldrich), 2 g of distilled water, and 25 g of a ball were loaded into a pot and mixed with a ball mill at 200 rpm for 50 minutes, to thereby prepare a slurry-like Pt/C composition. A negative electrode including a catalyst layer (negative electrode catalyst layer) formed of the Pt/C composition was manufactured in the same manner as in the positive electrode except that the slurry-like Pt/C composition was applied onto the gas diffusion layer (5 cm$^2$) so that a Pt/C application amount per unit area became 0.3 mg/cm$^2$.

Then, a solid polymer electrolyte membrane ("Nafion (trademark) 211", manufactured by Dupont) was arranged between the positive electrode catalyst layer and the negative electrode catalyst layer, and the laminate was subjected to pressure bonding under the conditions of 150° C. and 1 MPa for 3 minutes, to thereby manufacture a MEA. A pair of gaskets was attached to the MEA, and the resultant was further sandwiched between a pair of separators, to thereby manufacture a unit cell of a fuel cell. After that, the unit cell thus manufactured was set in a fuel cell automatic evaluation system (manufactured by Toyo Corporation) to perform a power generation test. Then, a current retention test (durability test) was performed.

In the power generation test, an open-circuit voltage was measured for 5 minutes by supplying, under a back pressure of 70 kPa, saturated humidified air (oxygen) to a positive electrode side of the unit cell at 2.5 L/min, supplying saturated humidified hydrogen to a negative electrode side of the unit cell at 1.0 L/min, and setting a cell temperature to 75° C. After that, the cell current density was retained at each current density of from 1.5 A/cm$^2$ to 0 A/cm$^2$ for 3 minutes, to thereby measure a cell voltage.

In the current retention test (durability test), under a back pressure of 70 kPa, saturated humidified air (oxygen) was supplied to a positive electrode side of the unit cell at 2.0 L/min, saturated humidified hydrogen was supplied to a negative electrode side of the unit cell at 0.5 L/min, and a cell temperature was set to 75° C. The current retention test (durability test) was performed by retaining the current density to be constant at 0.5 A/cm$^2$, and keeping this state for 60 hours. The durability of the battery was evaluated by this test.

After elapse of 60 hours from the start of the current retention test (durability test), the power generation test was performed again, and the potentials observed at a current density of 0.2 A/cm$^2$ in the power generation test before and after the current retention test (durability test) were compared to each other, to thereby evaluate durability.

Specifically, a value obtained by subtracting a potential (mV) observed at a current density of 0.2 A/cm$^2$ in the power generation test after the current retention test (durability test) from a potential (mV) observed at a current density of 0.2 A/cm$^2$ in the power generation test before the current retention test (durability test) was obtained as a potential decrease amount (mV) after an elapse of 60 hours.

[Results]

The results obtained by evaluating the carbon catalysts obtained in Examples 1 to 14 and Comparative Examples 1 to 6 for the following are shown in FIG. 3: an oxygen reduction-starting potential $E_{O2}$ (V vs. RHE) and a current density $i_{0.7}$ (mA/cm$^2$) as catalytic activity (initial activity) before the start of the durability test; a potential decrease amount (mV) after an elapse of 60 hours in the durability test; a N$_2$ desorption amount (mol/g) within a temperature range of from 600° C. to 1,000° C. and from 800° C. to 1,000° C. in the TPD; a zeta potential isoelectric point pH; a N/C ratio, a first/second nitrogen intensity ratio, and a first nitrogen/C$_{1s}$ intensity ratio by the XPS; a BET specific surface area (m$^2$/g); and presence or absence of a peak in the vicinity of a chemical shift of 150 ppm in a $^{13}$C solid state NMR spectrum.

As shown in FIG. 3, before the start of the durability test, the potential $E_{O2}$ and the current density $i_{0.7}$ indicating the catalytic activity of each of the carbon catalysts of Comparative Examples 1 to 6 were from 0.827 V (vs. RHE) to 0.834 V (vs. RHE) and from −1.51 mA/cm$^2$ to −1.86 mA/cm$^2$, respectively, whereas the potential $E_{O2}$ and the current density $i_{0.7}$ of each of the carbon catalysts of Examples 1 to 14 were from 0.825 V (vs. RHE) to 0.840 V (vs. RHE) and from −1.53 mA/cm$^2$ to −2.06 mA/cm$^2$, respectively. Specifically, the carbon catalysts of Examples 1 to 14 each had catalytic activity equal to or more than those of the carbon catalysts of Comparative Examples 1 to 6.

Meanwhile, in the durability test for 60 hours, the potential decrease amount of each of the carbon catalysts of Comparative Examples 1 to 6 was 117 mV or more, whereas the potential decrease amount of each of the carbon catalysts of Examples 1 to 14 was 77 mV or less. Specifically, the carbon catalysts of Examples 1 to 14 each had excellent durability compared to those of the carbon catalysts of Comparative Examples 1 to 6.

In addition, in the TPD, the N$_2$ desorption amount in the temperature range from 600° C. to 1,000° C. of each of the carbon catalysts of Comparative Examples 1 to 6 was 1.10×10$^{-5}$ mol/g or less, whereas the N$_2$ desorption amount in the temperature range from 600° C. to 1,000° C. of each of the carbon catalysts of Examples 1 to 14 was 3.5×10$^{-5}$ mol/g or more. Specifically, the carbon catalysts of Examples 1 to 14 each included a carbon structure exhibiting a significantly large N$_2$ desorption amount in the temperature range from 600° C. to 1,000° C. compared to those of Comparative Examples.

Further, in the TPD, the N$_2$ desorption amount in the temperature range from 800° C. to 1,000° C. of each of the carbon catalysts of Comparative Examples 1 to 6 was 0.74×10$^{-5}$ mol/g or less, whereas the N$_2$ desorption amount in the temperature range from 800° C. to 1,000° C. of each of the carbon catalysts of Examples 1 to 14 was 2.50×10$^{-5}$ mol/g or more. Specifically, the carbon catalysts of Examples 1 to 14 each included a carbon structure exhibiting a significantly large N$_2$ desorption amount in the temperature range from 800° C. to 1,000° C. compared to those of Comparative Examples.

In addition, the zeta potential isoelectric point of each of the carbon catalysts of Comparative Examples 1 to 6 was pH 9.1 or less, whereas the zeta potential isoelectric point of each of the carbon catalysts of Examples 1 to 14 was pH 9.5 or more. Specifically, the carbon catalysts of Examples 1 to 14 each included a carbon structure exhibiting a significantly high zeta potential isoelectric point compared to those of Comparative Examples.

In addition, the N/C ratio by the XPS of each of the carbon catalysts of Comparative Examples 1 to 6 was 2.0% or less, whereas the N/C ratio by the XPS of each of the carbon catalysts of Examples 1 to 14 was 3.5% or more. Specifically, the carbon catalysts of Examples 1 to 14 each included a carbon structure exhibiting a significantly high N/C ratio by the XPS compared to those of Comparative Examples.

Further, the first/second nitrogen intensity ratio by the XPS of each of the carbon catalysts of Comparative Examples 1 to 6 was 0.610 or less, whereas the first/second nitrogen intensity ratio by the XPS of each of the carbon catalysts of Examples 1 to 14 was 0.877 or more. Specifically, the carbon catalysts of Examples 1 to 14 each included a carbon structure exhibiting a significantly high first/second nitrogen intensity ratio by the XPS compared to those of Comparative Examples.

Further, the first nitrogen/$C_{1s}$ intensity ratio by the XPS of each of the carbon catalysts of Comparative Examples 1 to 6 was 0.015 or less, whereas the first nitrogen/$C_{1s}$ intensity ratio by the XPS of each of the carbon catalysts of Examples 1 to 14 was 0.026 or more. Specifically, the carbon catalysts of Examples 1 to 14 each included a carbon structure exhibiting a significantly high first nitrogen/$C_{1s}$ intensity ratio by the XPS compared to those of Comparative Examples.

In addition, the BET specific surface area of each of the carbon catalysts of Comparative Examples 1 to 6 was from 1,220 $m^2/g$ to 1,505 $m^2/g$, whereas the BET specific surface area of each of the carbon catalysts of Examples 1 to 14 was from 1,355 $m^2/g$ to 1,560 $m^2/g$. Specifically, the carbon catalysts of Examples 1 to 14 each had a BET specific surface area equal to or more than those of the carbon catalysts of Comparative Examples 1 to 6.

In addition, in the $^{13}C$ solid state NMR, a peak in the vicinity of a chemical shift of 150 ppm was not observed in each of the carbon catalysts of Comparative Examples 1 to 6, whereas the peak in the vicinity of a chemical shift of 150 ppm was observed in each of the carbon catalysts of Examples 1 to 14. Specifically, it was considered that the carbon structures of the carbon catalysts of Examples 1 to 14 each contained a large amount of a nitrogen-containing functional group, such as an imine.

In addition, although not shown, the carbon catalysts of Examples 1 to 14 each had a nitrogen content of 3.5 wt % or more obtained by elemental analysis, a maximum particle diameter of 10.0 μm or less, and an average particle diameter of 0.60 μm or less.

[Manufacturing of Zinc Air Cell]

A battery electrode having a catalyst layer containing a carbon catalyst formed therein was manufactured. Specifically, first, 0.25 g of the carbon catalyst of Example 1 and an electrolyte solution were loaded into a sample bottle and treated in an ultrasonic bath for 10 minutes. After that, the resultant was stirred with a homogenizer at 25,000 rpm for 10 minutes, and further treated with an ultrasonic homogenizer at an output of 30 W and a frequency of 20 kHz for 10 minutes, to thereby obtain a slurry-like composition for a catalyst layer containing the carbon catalyst uniformly dispersed therein.

The obtained slurry-like composition for a catalyst layer was applied onto a region having an area of 9 $cm^2$ of a gas diffusion layer ("29 BC", manufactured by SGL Carbon Co., Ltd.) (3.0 cm×3.0 cm) so that the content of the carbon catalyst per unit area of a battery electrode became 1.5 $mg/cm^2$, followed by drying, to thereby form a catalyst layer on the gas diffusion layer. Thus, a battery electrode having the catalyst layer containing the carbon catalyst formed therein was obtained. In addition, for comparison, a battery electrode was obtained in the same manner except that highly conductive carbon black (Ketjen black manufactured by Lion Corporation) was used instead of the carbon catalyst.

Then, a zinc air cell including the battery electrode obtained as described above was manufactured. Specifically, two aluminum laminates (manufactured by Dai Nippon Printing Co., Ltd.) each cut out to a size of 8 cm×6 cm were prepared. Part of one of the aluminum laminates was cut out to form a square window portion (2 cm×2 cm).

In addition, a nickel plate (thickness: 0.1 mm, manufactured by The Nilaco Corporation) cut out to a size of 3 cm×9 cm was prepared. A portion having a size of 2 cm×6 cm was cut off from the nickel plate, to thereby obtain an L-shaped nickel plate including a square base portion (3 cm×3 cm) and a rectangular terminal portion (1 cm×6 cm) extending from the base portion.

Then, the nickel plate was stacked on the one aluminum laminate so that the base portion of the nickel plate was exposed from the window portion of the one aluminum laminate. Further, nine holes (each having a diameter of 3 mm) that were regularly arranged were formed (three holes× three holes) as air intake holes in a portion (2 cm×2 cm) of the base portion of the nickel plate, which was exposed from the window portion of the aluminum laminate.

After that, the battery electrode was stacked on the base portion of the nickel plate so that a surface of the base portion of the nickel plate on an opposite side to the aluminum laminate and the gas diffusion layer of the battery electrode (3 cm×3 cm) obtained as described above were brought into contact with each other. Further, a thermal welding tape (manufactured by Dai Nippon Printing Co., Ltd.) was arranged so as to extend over the surrounding aluminum laminate from a frame-shaped outer peripheral portion having a width of 0.5 cm of a surface of the battery electrode on an opposite side to the nickel plate (that is, the surface of the catalyst layer). Through thermal welding of the thermal welding tape, the battery electrode, the nickel plate, and the aluminum laminate were integrated to obtain a positive electrode (air electrode).

Meanwhile, a portion having a size of 2 cm×6 cm was cut off from a copper foil (thickness: 20 μm, manufactured by Hohsen Corp.) cut out to a size of 3 cm×9 cm in the same manner as in the nickel plate, to thereby obtain an L-shaped copper foil including a square base portion (3 cm×3 cm) and a rectangular terminal portion (1 cm×6 cm) extending from the base portion. Then, the base portion of the copper foil and a zinc plate (thickness: 0.5 mm, manufactured by The Nilaco Corporation) cut out to a size of 3 cm×3 cm were welded to each other with an ultrasonic welding machine, to thereby obtain a zinc negative electrode.

After that, a cellulose separator (TF40-50, manufactured by Nippon Kodoshi Corporation) cut out to a size of 3 cm×3 cm was stacked on the surface of the catalyst layer of the positive electrode. Then, the zinc negative electrode was stacked on the cellulose separator so that a surface of the cellulose separator on an opposite side to the positive electrode and a surface of the zinc plate of the zinc negative electrode were brought into contact with each other. In this case, the nickel plate and the copper foil were arranged so that the terminal portion of the nickel plate and the terminal portion of the copper coil did not overlap with each other.

Further, the other aluminum laminate (8 cm×6 cm) was stacked on a surface of the zinc negative electrode on an opposite side to the cellulose separator (that is, the surface of the copper foil). Then, three sides out of four sides of the pair of stacked aluminum laminates were subjected to thermal welding, to thereby form an aluminum laminate bag opened on one side.

That is, in the aluminum laminate bag, the L-shaped nickel plate, the gas diffusion layer of the battery electrode, the catalyst layer of the battery electrode, the cellulose separator, the zinc plate of the zinc electrode, and the L-shaped copper foil of the zinc electrode were arranged in the stated order from the one aluminum laminate having the window portion formed therein to the other aluminum laminate.

Further, a 4 mol/L potassium hydroxide (manufactured by Hayashi Pure Chemical Ind., Ltd.) aqueous solution serving as an electrolytic solution was injected through the opening of the aluminum laminate bag. Finally, the opening of the aluminum laminate bag was closed by thermal welding to obtain a zinc air battery cell. The terminal portion of the nickel plate extending outside of the cell was utilized as a positive electrode terminal, and the terminal portion of the copper foil was utilized as a negative electrode terminal.

[Manufacturing of Magnesium Air Cell]

A magnesium air cell including the battery electrode obtained as described above was manufactured in the same manner as in the above-mentioned zinc air electrode. Specifically, an L-shaped magnesium alloy plate including a square base portion (3 cm×3 cm) and a rectangular terminal portion (1 cm×6 cm) extending from the base portion was used as a magnesium negative electrode instead of the above-mentioned zinc negative electrode, to thereby form an aluminum laminate bag having one side opened, in which the L-shaped nickel plate, the gas diffusion layer of the battery electrode, the catalyst layer of the battery electrode, the cellulose separator, and the magnesium negative electrode were arranged in the stated order from the one aluminum laminate having the window portion formed therein to the other aluminum laminate.

Then, a 4 mol/L sodium chloride (manufactured by Kanto Chemical Industry Co., Ltd.) aqueous solution serving as an electrolytic solution was injected through the opening of the aluminum laminate bag. Finally, the opening of the aluminum laminate bag was closed by thermal welding to obtain a magnesium air battery cell. The terminal portion of the nickel plate extending outside of the cell was utilized as a positive electrode terminal, and the terminal portion of the magnesium alloy plate was utilized as a negative electrode terminal.

[Evaluation of Characteristics of Air Cell]

A maximum output density of each of the zinc air cell and the magnesium air cell manufactured as described above was measured with a cell voltage of 0.5 V being set as a cut-off voltage through use of a charge/discharge device (HJ0505 SM8A, manufactured by HOKUTO DENKO CORPORATION).

The configurations of the positive electrode and the negative electrode of each of the zinc air cell and the magnesium air cell and the results obtained by measuring the maximum output density (mW/cm$^2$) thereof are shown in FIG. 4. As shown in FIG. 4, in any of the zinc air cell and the magnesium air cell, a significantly high maximum output density was obtained in the air cell including a positive electrode containing a carbon catalyst, compared to that of the air cell including a positive electrode containing carbon black. Specifically, it was confirmed that the carbon catalyst exhibited excellent catalytic activity in the air cell.

In addition, the durability of each of the zinc air cell and the magnesium air cell was evaluated. Specifically, the air cells manufactured as described above were subjected to an output characteristics test. Then, constant current discharge was performed at a current value of 10 mA/cm$^2$ up to 30% of a theoretical value. After that, the output characteristics test was performed again. Then, a value obtained by dividing an output value after the constant current discharge by an output value before the constant current discharge was multiplied by 100, to thereby calculate an output maintenance ratio (%).

The configurations of the positive electrode and the negative electrode of each of the zinc air cell and the magnesium air cell and the results obtained by measuring the output maintenance ratio thereof are shown in FIG. 5. As shown in FIG. 5, in any of the zinc air cell and the magnesium air cell, a significantly high output maintenance ratio was obtained in the air cell including a positive electrode containing a carbon catalyst, compared to that of the air cell including a positive electrode containing carbon black. Specifically, it was confirmed that the carbon catalyst exhibited excellent durability in the air cell.

The invention claimed is:

1. A carbon catalyst, comprising a carbon structure that exhibits a nitrogen desorption amount in the temperature range from 800° C. to 1,000° C. of 0.75×10$^{-5}$ mol/g or more in a temperature programmed desorption method including measuring a nitrogen desorption amount in the temperature range from 600° C. to 1,000° C.

2. The carbon catalyst according to claim 1, wherein the carbon catalyst comprises the carbon structure that exhibits a nitrogen desorption amount in the temperature range from 600° C. to 1,000° C. of 1.20×10$^{-5}$ mol/g or more in the temperature programmed desorption method including measuring a nitrogen desorption amount in the temperature range from 600° C. to 1,000° C.

3. The carbon catalyst according to claim 1, wherein the carbon catalyst comprises the carbon structure that exhibits a zeta potential isoelectric point of pH 9.2 or more.

4. The carbon catalyst according to claim 1, wherein the carbon catalyst comprises the carbon structure that exhibits a ratio of an intensity of a first nitrogen peak that has a peak top within a range of a binding energy of 398.0±1.0 eV, to an intensity of a second nitrogen peak that has a peak top within a range of a binding energy of 400.5±1.0 eV, of 0.620 or more, the first nitrogen peak and the second nitrogen peak being obtained by separating a peak derived from a 1s orbital of a nitrogen atom in a photoelectron spectrum obtained by X-ray photoelectron spectroscopy.

5. The carbon catalyst according to claim 1, wherein the carbon catalyst comprises the carbon structure that exhibits a ratio of an intensity of a first nitrogen peak that has a peak top within a range of a binding energy of 398.0±1.0 eV, to an intensity of a peak derived from a is orbital of a carbon atom, of 0.017 or more, the first nitrogen peak being obtained by separating a peak derived from a 1s orbital of a nitrogen atom in a photoelectron spectrum obtained by X-ray photoelectron spectroscopy.

6. The carbon catalyst according to claim 1, wherein the carbon catalyst comprises the carbon structure that exhibits a ratio of a nitrogen atom concentration to a carbon atom concentration of 1.5% or more, the nitrogen atom concentration and the carbon atom concentration being measured by X-ray photoelectron spectroscopy.

7. The carbon catalyst according to claim 1, wherein the carbon catalyst comprises the carbon structure in which a peak is observed in a vicinity of a chemical shift of 150 ppm in a spectrum obtained by $^{13}$C solid state nuclear magnetic resonance measurement.

8. The carbon catalyst according to claim 1, wherein the carbon catalyst comprises a metal.

9. The carbon catalyst according to claim 1, wherein the carbon catalyst has a specific surface area of 800 m$^2$/g or more measured by a BET method.

10. The carbon catalyst according to claim 1, wherein the carbon catalyst comprises the carbon structure that exhibits a nitrogen atom content of 1.5 wt % or more measured by elemental analysis based on a combustion method.

11. A battery electrode, comprising the carbon catalyst of claim 1.

12. A battery, comprising the battery electrode of claim 11.

13. A carbon catalyst, comprising a carbon structure that exhibits a nitrogen desorption amount in the temperature range from 600° C. to 1,000° C. of $1.20 \times 10^{-5}$ mol/g or more in a temperature programmed desorption method including measuring a nitrogen desorption amount in the temperature range from 600° C. to 1,000° C.

14. A carbon catalyst, comprising a carbon structure that exhibits a zeta potential isoelectric point of pH 9.2 or more.

15. A carbon catalyst, comprising a carbon structure that exhibits a ratio of an intensity of a first nitrogen peak that has a peak top within a range of a binding energy of 398.0±1.0 eV, to an intensity of a second nitrogen peak that has a peak top within a range of a binding energy of 400.5±1.0 eV, of 0.620 or more, the first nitrogen peak and the second nitrogen peak being obtained by separating a peak derived from a 1s orbital of a nitrogen atom in a photoelectron spectrum obtained by X-ray photoelectron spectroscopy, and wherein the carbon catalyst has a specific surface area of 1200 m²/g or more measured by a BET method.

\* \* \* \* \*